(12) United States Patent
Desai

(10) Patent No.: US 7,287,126 B2
(45) Date of Patent: Oct. 23, 2007

(54) METHODS AND APPARATUS FOR MAINTAINING CACHE COHERENCY

(75) Inventor: Kiran R. Desai, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 318 days.

(21) Appl. No.: 10/630,164

(22) Filed: Jul. 30, 2003

(65) Prior Publication Data

US 2005/0027945 A1    Feb. 3, 2005

(51) Int. Cl.
G06F 12/00    (2006.01)

(52) U.S. Cl. .................................... 711/145
(58) Field of Classification Search ............... 711/144, 711/145
See application file for complete search history.

(56) References Cited

U.S. PATENT DOCUMENTS

| | | | |
|---|---|---|---|
| 5,113,514 A * | 5/1992 | Albonesi et al. ............ | 711/144 |
| 5,369,753 A | 11/1994 | Tipley | |
| 5,512,874 A | 4/1996 | Poston | |
| 5,523,703 A | 6/1996 | Yamamoto et al. | |
| 5,659,710 A | 8/1997 | Sherman et al. | |
| 5,664,150 A | 9/1997 | Isaac et al. | |
| 5,666,068 A | 9/1997 | Ehmann | |
| 5,686,872 A | 11/1997 | Fried et al. | |
| 5,731,711 A | 3/1998 | Gabara | |
| 5,765,199 A | 6/1998 | Chang et al. | |
| 5,802,577 A | 9/1998 | Bhat et al. | |
| 5,829,038 A * | 10/1998 | Merrell et al. .............. | 711/143 |
| 5,867,162 A | 2/1999 | O'Leary et al. | |
| 5,905,998 A | 5/1999 | Ebrahim et al. | |
| 5,913,226 A | 6/1999 | Sato | |
| 5,943,684 A | 8/1999 | Arimilli et al. | |
| 5,959,472 A | 9/1999 | Nagamatsu et al. | |
| 5,996,049 A | 11/1999 | Arimilli et al. | |
| 6,034,551 A | 3/2000 | Bridgewater, Jr. | |
| 6,073,211 A | 6/2000 | Cheng et al. | |
| 6,157,974 A | 12/2000 | Gasparik | |

(Continued)

OTHER PUBLICATIONS

Tomasevic, M; Milutinovic, V. "Hardware Approaches to Cache Coherence in Shared-Memory Multiprocessors, Part 1." IEEE Micro. vol. 14, Issue 5, pp. 52-59. Oct. 1994.

(Continued)

Primary Examiner—Matthew Kim
Assistant Examiner—Shane M Thomas
(74) Attorney, Agent, or Firm—Hanley, Flight & Zimmerman, LLC

(57) ABSTRACT

Methods and apparatus for maintaining cache coherency and reducing write-back traffic by using an enhanced MESI cache coherency protocol are disclosed. The enhanced MESI protocol includes the traditional MESI cache states (i.e., modified, exclusive, shared, invalid, and pending) as well as two additional cache states (i.e., enhanced modified and enhanced exclusive). An enhanced modified cache line is a cache line that is different than main memory and a copy of the cache line may be in another cache. An enhanced exclusive cache line is a cache line that is not modified and a copy of the cache line is in another cache in a modified state. Depending on the state of a victimized cache line, an internal inquiry may be issued to other caches and/or a write-back operation may be performed prior to victimizing the selected cache line.

26 Claims, 13 Drawing Sheets

U.S. PATENT DOCUMENTS

| | | | |
|---|---|---|---|
| 6,167,492 A | 12/2000 | Keller et al. | |
| 6,170,040 B1 | 1/2001 | Lee et al. | |
| 6,266,744 B1 | 7/2001 | Hughes et al. | |
| 6,292,872 B1* | 9/2001 | Arimilli et al. | 711/146 |
| 6,307,401 B1 | 10/2001 | Bridgewater, Jr. | |
| 6,317,839 B1 | 11/2001 | Wells | |
| 6,320,406 B1 | 11/2001 | Morgan et al. | |
| 6,321,297 B1 | 11/2001 | Shamanna et al. | |
| 6,339,344 B1 | 1/2002 | Sakata et al. | |
| 6,345,340 B1 | 2/2002 | Arimilli et al. | |
| 6,360,301 B1 | 3/2002 | Gaither et al. | |
| 6,378,048 B1 | 4/2002 | Prudvi et al. | |
| 6,405,289 B1 | 6/2002 | Arimilli et al. | |
| 6,411,146 B1 | 6/2002 | Kuo | |
| 6,425,060 B1 | 7/2002 | Mounes-Toussi et al. | |
| 6,438,660 B1 | 8/2002 | Reams | |
| 6,490,661 B1 | 12/2002 | Keller et al. | |
| 6,519,685 B1 | 2/2003 | Chang | |
| 6,549,989 B1 | 4/2003 | Arimilli et al. | |
| 6,549,990 B2 | 4/2003 | Hughes et al. | |
| 6,552,578 B1 | 4/2003 | Cheung et al. | |
| 6,574,710 B1 | 6/2003 | Gaither et al. | |
| 6,593,801 B1 | 7/2003 | Hattori | |
| 6,615,322 B2 | 9/2003 | Arimilli et al. | |
| 6,615,323 B1 | 9/2003 | Petersen et al. | |
| 6,629,212 B1 | 9/2003 | Arimilli et al. | |
| 6,694,409 B2 | 2/2004 | Chang | |
| 6,724,891 B1 | 4/2004 | Huang et al. | |
| 6,760,819 B2 | 7/2004 | Dhong et al. | |
| 6,775,748 B2 | 8/2004 | Jamil et al. | |
| 6,785,774 B2 | 8/2004 | Arimilli et al. | |
| 6,791,371 B1 | 9/2004 | Cheung | |
| 6,834,327 B2 | 12/2004 | Lyon | |
| 6,880,031 B2 | 4/2005 | Singh et al. | |
| 7,000,078 B1 | 2/2006 | Jones et al. | |
| 2002/0017920 A1 | 2/2002 | Bridgewater, Jr. | |
| 2003/0154352 A1 | 8/2003 | Jamil et al. | |
| 2003/0198296 A1 | 10/2003 | Bonelli et al. | |
| 2004/0039880 A1* | 2/2004 | Pentkovski et al. | 711/146 |
| 2005/0166020 A1 | 7/2005 | Jamil et al. | |

OTHER PUBLICATIONS

Tomasevic, M; Milutinovic, V. "Hardware Approaches to Cache Coherence in Shared-Memory Multiprocessors, Part 2." IEEE Micro. vol. 14, Issue 6, pp. 61-66. Dec. 1994.

"Intel® Itanium™ Processor Hardware Developer's Manual." ftp://download.intel.com/design/Itanium/Downloads/24870102.pdf. Document No.: 248701-002. Aug. 2001.

"Intel® Itanium™ 2 Processor Hardware Developer's Manual." ftp://download.intel.com/design/Itanium2/manuals/25110901.pdf. Document No.: 251109-001. Jul. 2002.

"Intel® Pentium® 4 Processor with 512-KB L2 Cache on 0.13 Micron Process Datasheet." ftp://download.intel.com/design/Pentium4/datashts/29864309.pdf. Document No.: 298643-009. May 2003.

Handy, *The Cache Memory Book*, Academic Press, Inc., 2$^{nd}$ edition, pp. 126-127; 156-186 (© 1998).

Lee, *A Secondary Cache Controller Design for a High-End Microprocessor*, Institute of Electrical and Electronics Engineers, Inc., pp. 1141-1146 (© 1992).

* cited by examiner

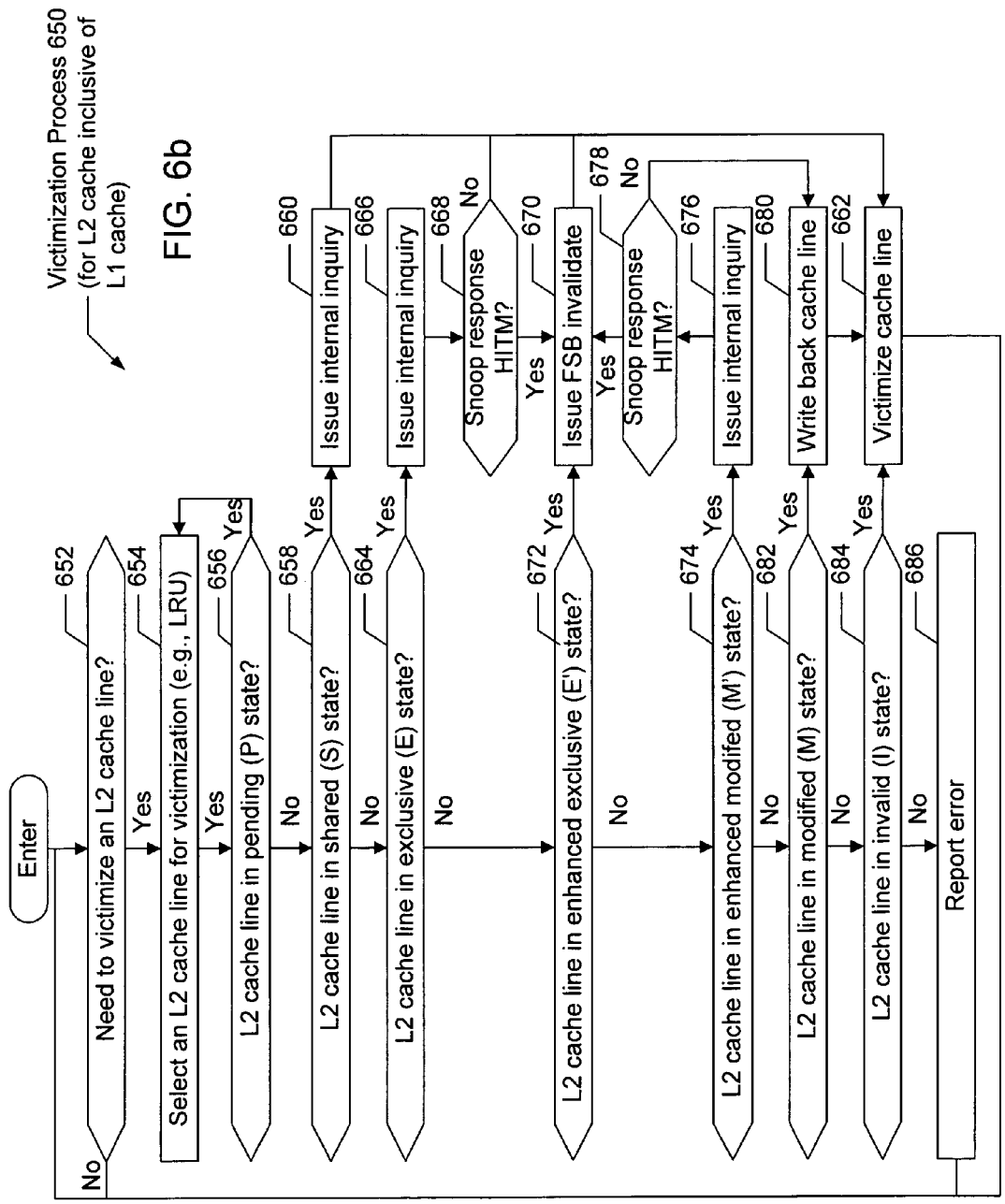

METHODS AND APPARATUS FOR MAINTAINING CACHE COHERENCY

TECHNICAL FIELD

The present disclosure pertains to cache memory and, more particularly, to methods and an apparatus for maintaining cache coherency.

BACKGROUND

In an effort to increase computational power, many computing systems are turning to multi-processor systems. A multi-processor system typically includes a plurality of microprocessors, a plurality of associated caches, and a main memory. In an effort to reduce bus traffic to the main memory, many multi-processor systems use a "write-back" (as opposed to a "write-through") policy. A "write-back" policy is a cache procedure whereby a microprocessor may locally modify data in its cache without updating the main memory until the cache data needs to be replaced.

In order to maintain cache coherency in such a system, a cache coherency protocol is used. One well known cache coherency protocol is the MESI (modified-exclusive-shared-invalid) cache coherency protocol. Typically, a cache designed for the MESI protocol uses three bits to encode five states. The five states are modified, exclusive, shared, invalid, and pending.

In an effort to further reduce bus traffic to the main memory, many of these cache coherency protocols allow a first cache that is holding locally modified data (i.e., "dirty" data) to directly supply a second cache that is requesting the same cache line (i.e., memory block) without updating main memory. Typically, the first cache then puts its cache line in an "owned" state to indicate that the line is "dirty" and shared. However, when the "owned" cache line is victimized (e.g., replaced), the first cache must write the line back to main memory so that the modifications are not lost. This write-back generates bus traffic to the main memory. Bus traffic increase memory latency and power consumption. Subsequent modifications to the cache line in the second cache will also need to be written-back to main memory, thereby generating additional bus traffic.

BRIEF DESCRIPTION OF THE DRAWINGS

FIG. 6b is a flowchart representative of an example process which may be executed by a device to implement an example mechanism for victimization from an L2 cache when the L2 cache is designed to be inclusive of the L1 cache.

DETAILED DESCRIPTION

Generally, the disclosed system maintains cache coherency and reduces write-back traffic by using an enhanced MESI cache coherency protocol. The enhanced MESI protocol includes the traditional MESI cache states (i.e., modified, exclusive, shared, invalid, and pending) as well as two additional cache states (i.e., enhanced modified and enhanced exclusive). A modified cache line is a cache line that is different than main memory. In contrast, an enhanced modified cache line is a cache line that is different than main memory and a copy of the cache line is in another cache. For example, an L2 cache holding a cache line in the enhanced modified state "knows" an L1 cache holds the same cache line. However, the L2 cache does not necessarily know the state of the cache line in the L1 cache. An exclusive cache line is a cache line that is not modified (i.e., the same as main memory). In contrast, an enhanced exclusive cache line is a cache line that is not modified and a copy of the cache line is in another cache in a modified state. For example, an L2 cache holding a cache line in the enhanced exclusive state "knows" an L1 cache holds the same cache line in the modified state.

When a cache using the enhanced MESI protocol is full and needs to bring in a new cache line, the cache must select an existing cache line to victimize. A cache line may be selected for victimization according to any well known victimization policy. For example, a least recently used victimization policy may be used to select a cache line for victimization. Depending on the state of the selected cache line, an internal inquiry may be issued to other caches and/or a write-back operation may be performed prior to victimizing the selected cache line.

For example, an L2 cache may issue an inquiry to an L1 cache if the L2 cache is about to victimize a cache line in the enhanced modified state. The L1 cache responds to the internal inquiry by invalidating the cache line associated with the internal inquiry or posting a hit-modified signal depending on the current state of the cache line associated with the internal inquiry in the L1 cache. If the L1 cache does not hold the cache line, the L1 cache posts a no-hit signal. Based on how the L1 cache responds to the internal inquiry, the L2 cache may victimize the cache line without performing a write-back to main memory.

In addition, snoop probes may be filtered by monitoring a snoop queue. Depending on the type of snoop probe in the snoop queue and the state of the associated cache line in the L2 cache and/or the L2 write-back queue 306, cache hit information is posted and snoop probes may be sent to other caches in an effort to filter snoops and reduce bus traffic. This snoop filtering may be performed with or without the use of tags.

Figure 1:
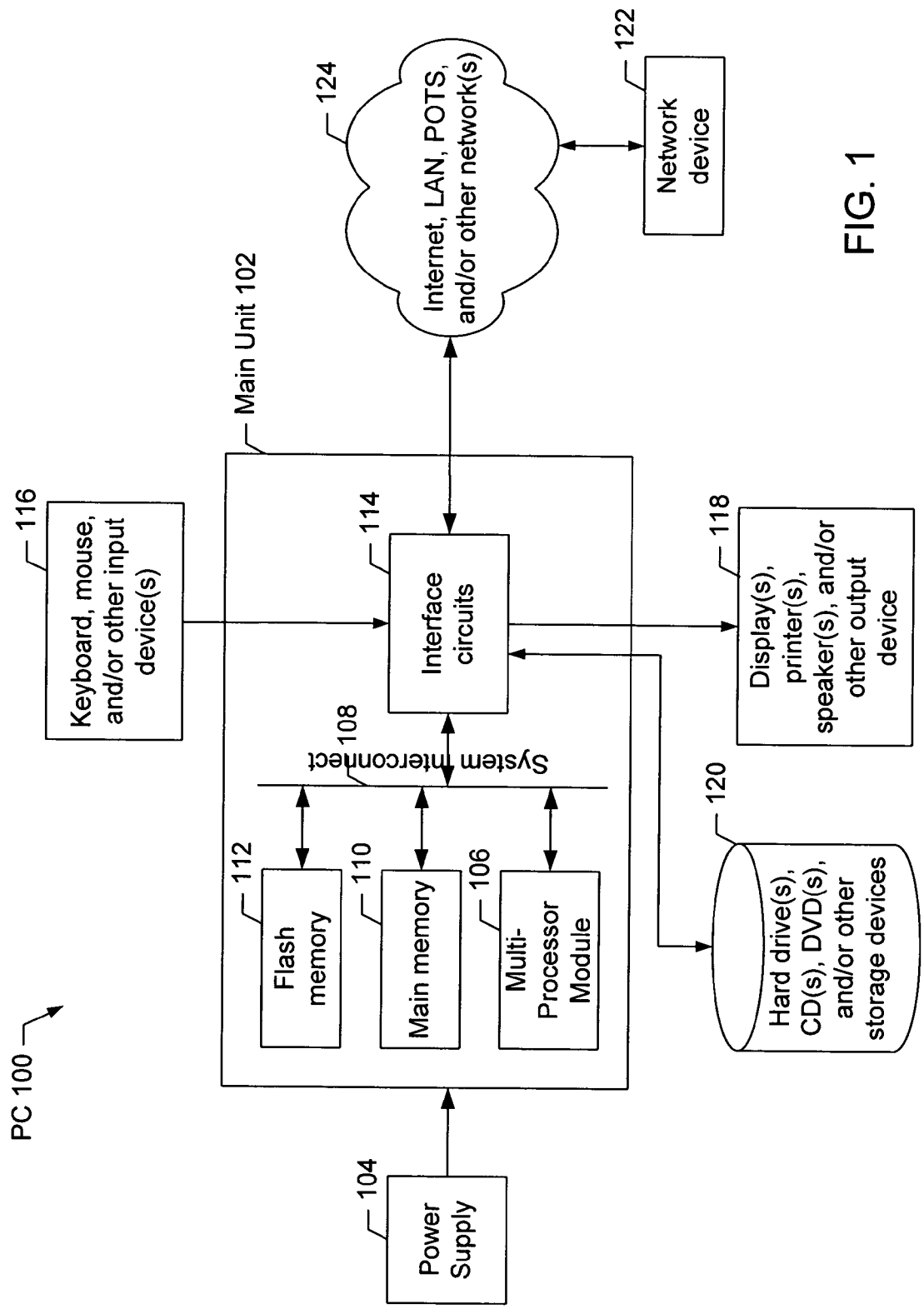
FIG. 1 is a block diagram of an example computer system illustrating an environment of use for the disclosed system.

Turning now to a more detailed description, FIG. 1 is a block diagram of an example computer system illustrating an environment of use for the disclosed system. The computer system 100 may be a personal computer (PC) or any other computing device. In the example illustrated, the computer system 100 includes a main processing unit 102 powered by a power supply 104. The main processing unit 102 may include a multi-processor module 106 electrically coupled by a system interconnect 108 to a main memory device 110, a flash memory device 112, and one or more interface circuits 114. In an example, the system interconnect 108 is an address/data bus. Of course, a person of ordinary skill in the art will readily appreciate that interconnects other than busses may be used to connect the multi-processor module 106 to the other devices 110-114. For example, one or more dedicated lines and/or a crossbar may be used to connect the multi-processor module 106 to the other devices 110-114.

The multi-processor module 106 may include any type of well known processor, such as a processor from the Intel Pentium® family of microprocessors, the Intel Itanium® family of microprocessors, the Intel Centrino® family of microprocessors, and/or the Intel XScale® family of microprocessors. In addition, the multi-processor module 106 may include any type of well known cache memory, such as static random access memory (SRAM). The main memory device 110 may include dynamic random access memory (DRAM) and/or any other form of random access memory. For example, the main memory device 110 may include double data rate random access memory (DDRAM). The main memory device 110 may also include non-volatile memory. In an example, the main memory device 110 stores a software program which is executed by the multi-processor module 106 in a well known manner. The flash memory device 112 may be any type of flash memory device. The flash memory device 112 may store firmware used to boot the computer system 100.

The interface circuit(s) 114 may be implemented using any type of well known interface standard, such as an Ethernet interface and/or a Universal Serial Bus (USB) interface. One or more input devices 116 may be connected to the interface circuits 114 for entering data and commands into the main processing unit 102. For example, an input device 116 may be a keyboard, mouse, touch screen, track pad, track ball, isopoint, and/or a voice recognition system.

One or more displays, printers, speakers, and/or other output devices 118 may also be connected to the main processing unit 102 via one or more of the interface circuits 114. The display 118 may be a cathode ray tube (CRT), a liquid crystal displays (LCD), or any other type of display. The display 118 may generate visual indications of data generated during operation of the main processing unit 102. The visual indications may include prompts for human operator input, calculated values, detected data, etc.

The computer system 100 may also include one or more storage devices 120. For example, the computer system 100 may include one or more hard drives, a compact disk (CD) drive, a digital versatile disk drive (DVD), and/or other computer media input/output (I/O) devices.

The computer system 100 may also exchange data with other devices 122 via a connection to a network 124. The network connection may be any type of network connection, such as an Ethernet connection, digital subscriber line (DSL), telephone line, coaxial cable, etc. The network 124 may be any type of network, such as the Internet, a telephone network, a cable network, and/or a wireless network. The network devices 122 may be any type of network devices 122. For example, the network device 122 may be a client, a server, a hard drive, etc.

Figure 2:
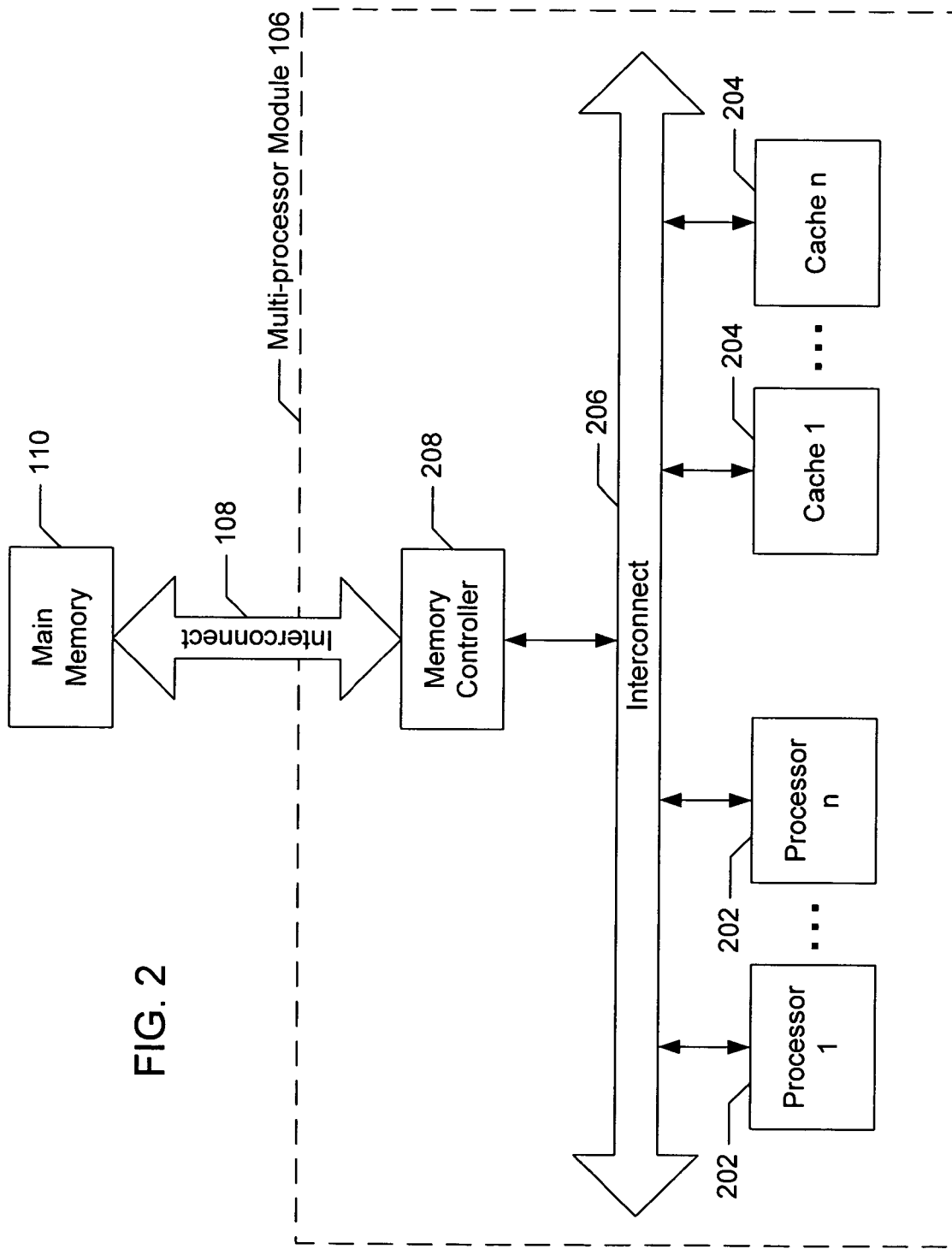
FIG. 2 is a more detailed block diagram of the example multi-processor module illustrated in FIG. 1.

FIG. 2 is a more detailed block diagram of the example multi-processor module 106 illustrated in FIG. 1. The multi-processor module 106 shown includes one or more processing cores 202 and one or more caches 204 electrically coupled by an interconnect 206. The processor(s) 202 and/or the cache(s) 204 communicate with the main memory 110 over the system interconnect 108 via a memory controller 208.

Each processor 202 may be implemented by any type of processor, such as an Intel XScale® processor. Each cache 204 may be constructed using any type of memory, such as static random access memory (SRAM). The interconnect 206 may be any type of interconnect such as a bus, one or more dedicated lines, and/or a crossbar. Each of the components of the multi-processor module 106 may be on the same chip or on separate chips. For example, the main memory 110 may reside on a separate chip. Typically, if activity on the system interconnect 108 is reduced, computational performance is increased and power consumption is reduced. For example, avoiding unnecessary write-backs from a cache 204 to the main memory 110 increases the overall efficiency of the multi-processor module 106.

Figure 3:
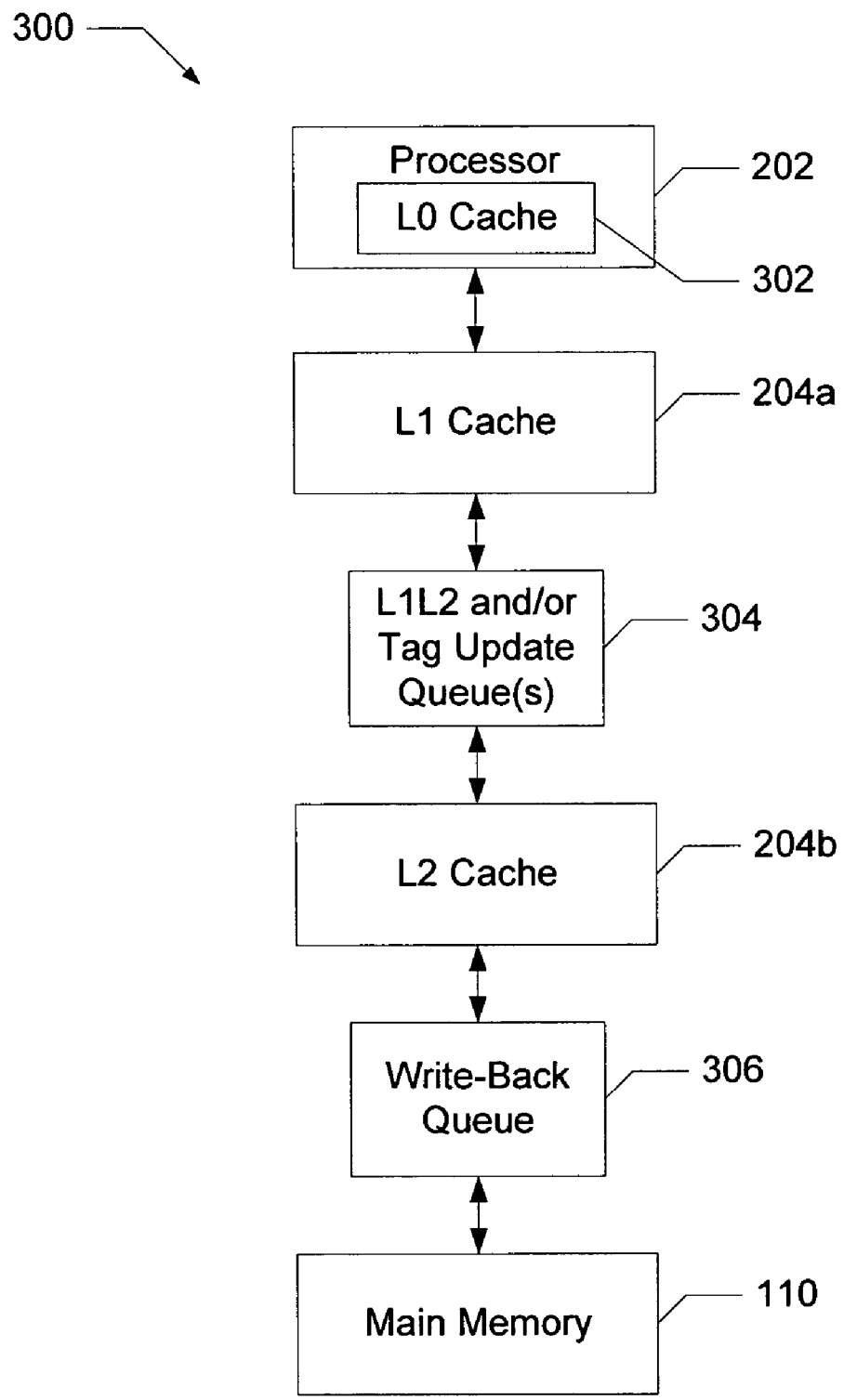
FIG. 3 is a block diagram of an example memory hierarchy.

FIG. 3 is a block diagram of an example memory hierarchy 300. Typically, memory elements (e.g., registers, caches, main memory, etc.) that are "closer" to the processor 202 in the memory hierarchy 300 are faster than memory elements that are "farther" from the processor 202 in the memory hierarchy 300. As a result, closer memory elements are used for potentially frequent operations, and closer memory elements are checked first when the processor 202 executes a memory operation (e.g., a read or a write).

Closer memory elements are typically constructed using faster memory technologies. However, faster memory technologies are typically more expensive than slower memory technologies. Accordingly, close memory elements are typically smaller than distant memory elements. Although four levels of memory are shown in FIG. 3, persons of ordinary skill in the art will readily appreciate that more or fewer levels of memory may alternatively be used.

In the illustrated example, when a processor 202 executes a memory operation, the request is passed to an L0 cache 302. Typically, the L0 cache 302 is internal to the processor 202. However, the L0 cache 302 may be external to the processor 202. If the L0 cache 302 holds the requested memory in a state that is compatible with the memory request (e.g., a write request is made and the L0 cache holds the memory in an "exclusive" state), the L0 cache 302 fulfills the memory request (i.e., an L0 cache hit). If the L0 cache 302 does not hold the requested memory (i.e., an L0 cache miss), the memory request is passed on to an Li cache 204a which is typically external to the processor 202, but may be internal to the processor 202.

If the L1 cache 204a holds the requested memory in a state that is compatible with the memory request, the L1 cache 204a fulfills the memory request (i.e., an L1 cache hit). In addition, the requested memory may be moved up from the L1 cache 204a to the L0 cache 302. If the L1 cache 204a does not hold the requested memory (i.e., an L1 cache miss), the memory request is passed on to an L2 cache 204b which is typically external to the processor 202, but may be internal to the processor 202.

Like the L1 cache 204a, if the L2 cache 204b holds the requested memory in a state that is compatible with the memory request, the L2 cache 204b fulfills the memory request (i.e., an L2 cache hit). In addition, the requested memory may be moved up from the L2 cache 204b to the L1 cache 204a and/or the L0 cache 302. In the illustrated example, if the L2 cache 204b does not hold the requested memory, the memory request is passed on to the main memory 110 (i.e., an L2 cache miss). If the memory request is passed on to the main memory 110, the main memory 110 fulfills the memory request. In addition, the requested memory may be moved up from the main memory 110 to the L2 cache 204b, the L1 cache 204a, and/or the L0 cache 302.

When cache lines and/or memory requests are being moved between two caches and/or between a cache and main memory 110, an intermediate structure may be used. For example, an L1L2 queue 304 may be used to move a cache line from the L1 cache 204a to the L2 cache 204b when the cache line is being victimized in the L1 cache 204a. Similarly a write-back queue 306 may be used to move a cache line from the L2 cache 204b to the main memory 110 when the cache line is being victimized in the L2 cache 204b.

Figure 4:
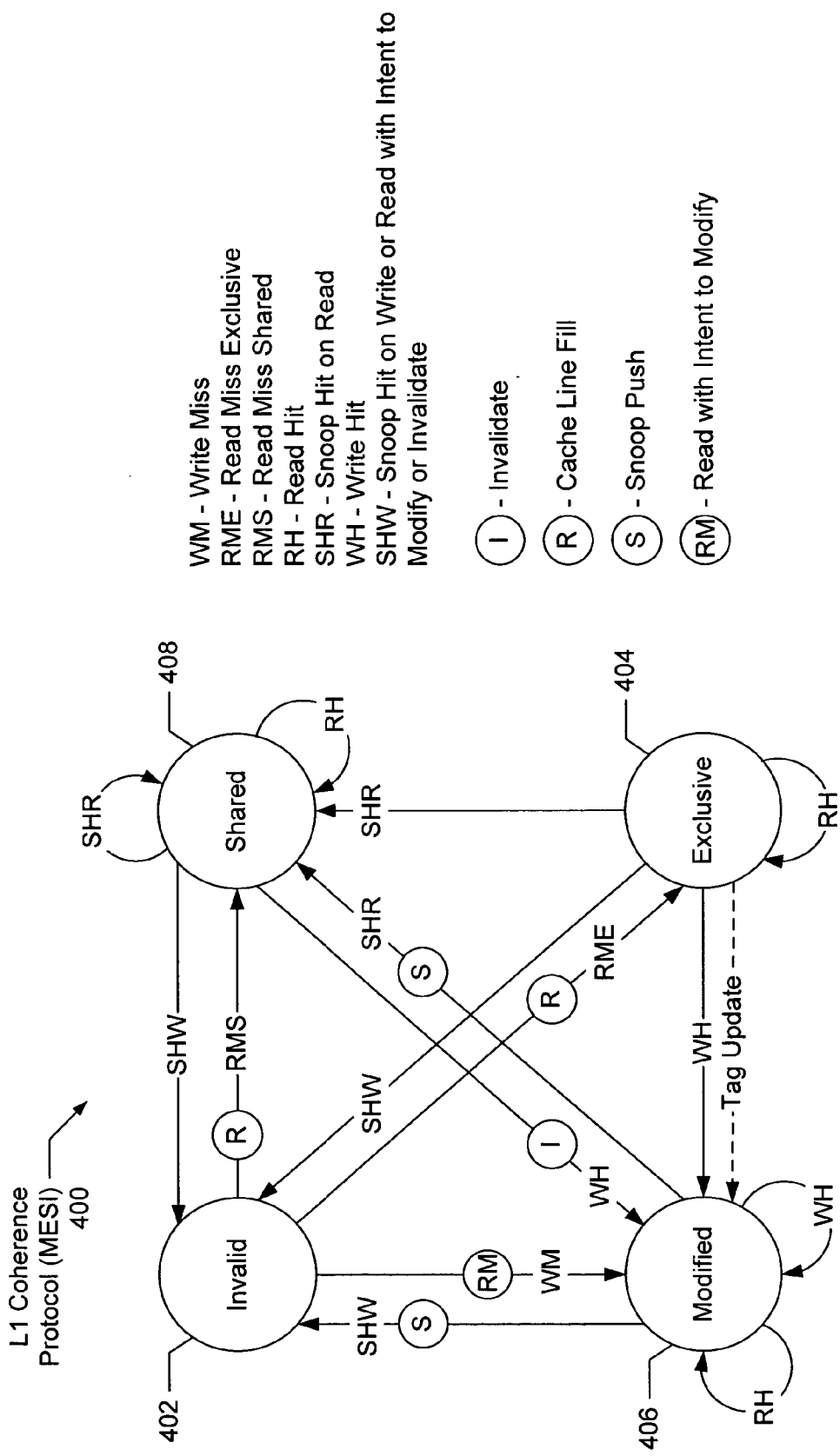
FIG. 4 is a state diagram of a MESI cache coherency protocol which may be used by the L1 cache illustrated in FIG. 3.

FIG. 4 is a state diagram of a MESI cache coherency protocol 400 which may be used by the L1 cache 204a illustrated in FIG. 3. This protocol 400 includes five states. Specifically, the MESI cache coherency protocol 400 includes an invalid state 402, an exclusive state 404, a modified state 406, a shared state 408, and a pending state (not shown). Of course, a person of ordinary skill in the art will readily appreciate that other cache coherency protocols may be used without departing from the scope or spirit of the disclosed system.

Each cache line in the cache 204a using the MESI protocol 400 is associated with one of these states. In an example, the state of a cache line is recorded in a cache directory. In another example, the state of a cache line is recorded in a tag associated with the cache line. In the MESI cache coherency protocol 400 there are five possible states. Accordingly, each state may be represented by a different digital combination (e.g., 000=Modified, 001=Exclusive, 010=Shared, 011=Invalid, and 100=Pending). The state of a cache line may be changed by retagging the cache line. For example, retagging a cache line from "exclusive" to "shared" may be accomplished by changing a tag associated with the cache line from "001" to "010." Of course, a person of ordinary skill in the art will readily appreciate that any method of storing and changing a cache line state may be used without departing from the scope or spirit of the disclosed system.

An "invalid" cache line is a cache line that does not contain useful data (i.e., the cache line is effectively empty). An "exclusive" cache line is a cache line that is "non-modified" (i.e., the same as main memory 110). A "modified" cache line is a cache line that is "dirty" (i.e., different from main memory 110) (e.g., a new value was written to the cache copy, but not to main memory's copy). A "shared" cache line is a cache line that is held by more than one cache. In some implementations, an "owned" state is added or combined with another state. An "owned" cache line is a cache line that is "modified" and "shared" (i.e., "dirty" and held by another cache). The "owner" of a cache line is responsible for eventually updating main memory 110 with the modified value (i.e., the "owner" is responsible for performing the write-back). A "pending" cache line is a cache line that is associated with a memory fill in progress or a snoop confirm in progress. A write-back of an exclusive or shared line is merely a notification on the system bus of victimization from the processor caches. A write-back of an exclusive or shared line does not involve any data transfer.

Several different events may be observed by a cache 204a using this protocol 400 which will cause the cache 204a to transition from one of these states to another of these states. These events include a write-miss (WM), a read-miss-exclusive (RME), a read-miss-shared (RMS), a read-hit (RH), a write-hit (WH), a snoop-hit-on-read (SHR), and a snoop-hit-on-write/read-with-intent-to-modify (SHW).

A write-miss (WM) event is caused by the multi-processor module 106 attempting to write a cache line to a cache 204a when that cache 204a does not hold the cache line. A read-miss-exclusive (RME) event is caused by the multi-processor module 106 attempting to read a cache line from one cache 204a when that cache 204a does not hold the cache line, and no other cache 204 currently holds the cache line. A read-miss-shared (RMS) event is caused by the multi-processor module 106 attempting to read a cache line from one cache 204a when that cache 204a does not hold the cache line, but another cache 204 does hold the cache line in the shared state. A read-hit (RH) event is caused by the multi-processor module 106 attempting to read a cache line from a cache 204a that holds the cache line. Other caches 204 holding the same line (but not supplying the line) see such a read as a snoop-hit-on-read (SHR) event. A write-hit (WH) event is caused by the multi-processor module 106 attempting to write a cache line to a cache 204a that holds the cache line. Other caches 204 holding the same line see such a write as a snoop-hit-on-write (SHW) event. A snoop hit associated with a read operation where there is an intent to modify the data is handled the same way as a snoop-hit-on-write (SHW) event.

In addition to transitioning a cache line from one state to another state, these events may cause bus transactions to occur. For example, a cache state transition may be associated with an invalidate operation (I), a cache line fill operation (R), a snoop push operation (S), or a read-with-intent-to-modify operation (RM). An invalidate operation (I) causes an invalidate signal to be broadcast on the interconnect 206. The invalidate signal causes other caches 204 to place the associated cache line in an invalid (I) state (effectively erasing that line from the cache). A cache line fill operation (R) causes a cache line to be read into the cache 204a from main memory 110. A snoop push operation (S) causes the contents of a cache line to be written back to main memory 110. A read-with-intent-to-modify operation (RM) causes other caches 204 to place the associated cache line in an invalid (I) state and causes a cache line to be read into the cache 204a from main memory 110.

In addition to the typical MESI cache coherency protocol events, a "tag update" event may be included. The tag update event is generated when an L1 cache line changes from the exclusive state 404 to the modified state 406. The tag update event causes a tag update entry to be placed in the tag update queue 304. As described in detail below, an entry in the tag update queue causes an L2 cache 204b using an enhanced MESI cache coherency protocol to transition the cache line to an enhanced exclusive state. The enhanced exclusive state denotes that the L1 cache 204a owns the cache line in the modified state 406.

Figure 5:
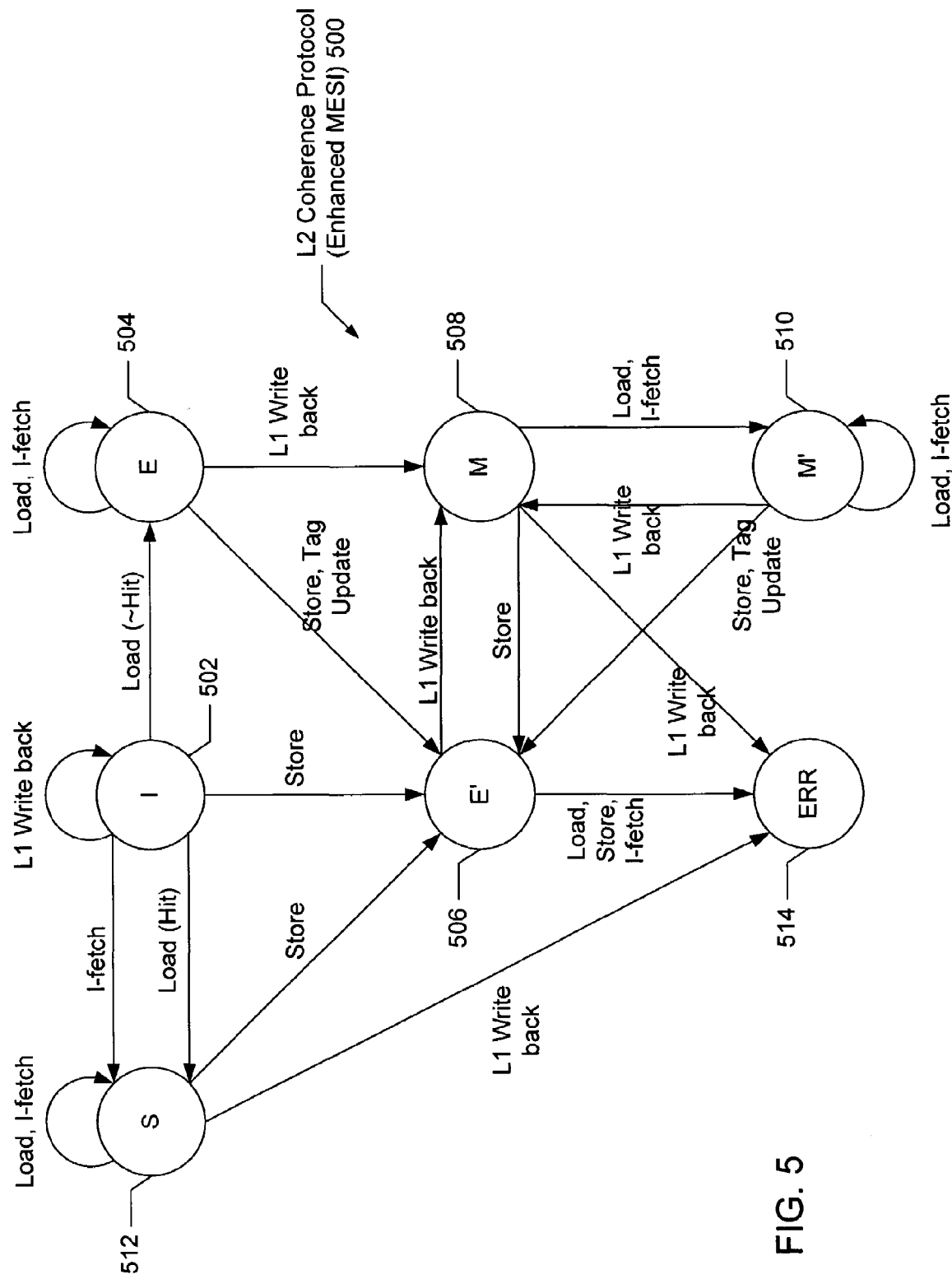
FIG. 5 is a state diagram of an enhanced MESI cache coherency protocol which may be used by the L2 cache illustrated in FIG. 3.

FIG. 5 is a state diagram of an enhanced MESI cache coherency protocol which may be used by the L2 cache 204b illustrated in FIG. 3. This protocol 500 includes seven states. Specifically, the enhanced MESI cache coherency protocol 500 includes an invalid state 502, an exclusive state 504, an enhanced exclusive state 506, a modified state 508, an enhanced modified state 510, a shared state 512, and a pending state (not shown). In addition to these seven states, an error state 514 is shown for the purpose of illustration.

Each cache line (i.e., memory block) in the L2 cache 204b is associated with one of these enhanced MESI protocol states. In an example, the state of a cache line is recorded in a cache directory. In another example, the state of a cache line is recorded in a tag associated with the cache line. In the enhanced MESI cache coherency protocol 500 there are seven possible states. Accordingly, each state may be represented by a different digital combination (e.g., 000=Modified, 001=Exclusive, 010=Shared, 011=Invalid, 100=Pending, 101=Enhanced Modified, and 110=Enhanced Exclusive). The state of a cache line may be changed by retagging the cache line. For example, retagging a cache line from "exclusive" to "shared" may be accomplished by changing a tag associated with the cache line from "001" to "010." Of course, a person of ordinary skill in the art will readily appreciate that any method of storing and changing a cache line state may be used without departing from the scope or spirit of the disclosed system.

An "invalid" cache line is a cache line that does not contain useful data (i.e., the cache line is effectively empty). An "exclusive" cache line is a cache line that is "non-modified" (i.e., the same as main memory 110). Another cache (e.g., L1 cache 204a) may own the same cache line in either an exclusive state or a modified state. A "modified" cache line is a cache line that is "dirty" (i.e., different from main memory 110). Another cache (e.g., L1 cache 204a) does not own this cache line. A "shared" cache line is a cache line that is held by more than one cache. A "pending" cache line is a cache line that is associated with a memory fill in progress or a snoop confirm in progress. An "enhanced exclusive" cache line is a cache line that is "non-modified" (i.e., the same as main memory 110) and a copy of the cache line is in another cache (e.g., an L1 cache 204a) in a modified state. An "enhanced modified" cache line is a cache line that is "dirty" (i.e., different from main memory 110) and a copy of the cache line may be in another cache (e.g., an L1 cache 204a) in any state.

Several different events may be observed by a cache 204b using this protocol 500 which will cause the cache 204b to transition from one of these states to another of these states. These events include an instruction fetch (I-fetch) event, a load event, a load hit event, a load no-hit event, a store event, and an L1 write-back event. In addition, a tag update event may be used in some examples.

An instruction fetch event is caused by the multi-processor module 106 attempting to read an instruction from the cache 204b. A load event is caused by the multi-processor module 106 attempting to read data from the cache 204b regardless of whether the cache 204b actually holds the desired data. A load hit event is caused by the multi-processor module 106 attempting to read data from the cache 204b when the cache 204b holds the desired data. A load no-hit event is caused by the multi-processor module 106 attempting to read data from the cache 204b when the cache 204b does not hold the desired data. A store event is caused by the multi-processor module 106 attempting to store data to the cache 204b. An L1 write-back event is caused by the L1 cache 204a writing a cache line back to main memory. A tag update event is caused when a L1 cache line transitions from the exclusive state to the modified state.

As described above, in addition to the typical MESI cache coherency protocol events, a "tag update" event may be included. The tag update event is generated when an L1 cache line changes from the exclusive state 404 to the modified state 406. The tag update event causes a tag update entry to be placed in the tag update queue 304. An entry in the tag update queue 304 causes an L2 cache 204b using an enhanced MESI cache coherency protocol to transition the cache line to the enhanced exclusive state 506. The enhanced exclusive state 506 denotes that the L1 cache 204a owns the cache line in the modified state 406.

The tag update queue 304 facilitates an early MESI update to the L2 cache 402a. The tag update queue 304 is a snoopable structure, since it can provide information about a HITM in the L1 cache 402a. After the tag update entry is placed in the tag update queue 304, the L1 cache 402a maintains its cache line in the modified state 406, since the L1 cache 402a is responsible for writing-back the modified data.

Figure 6:
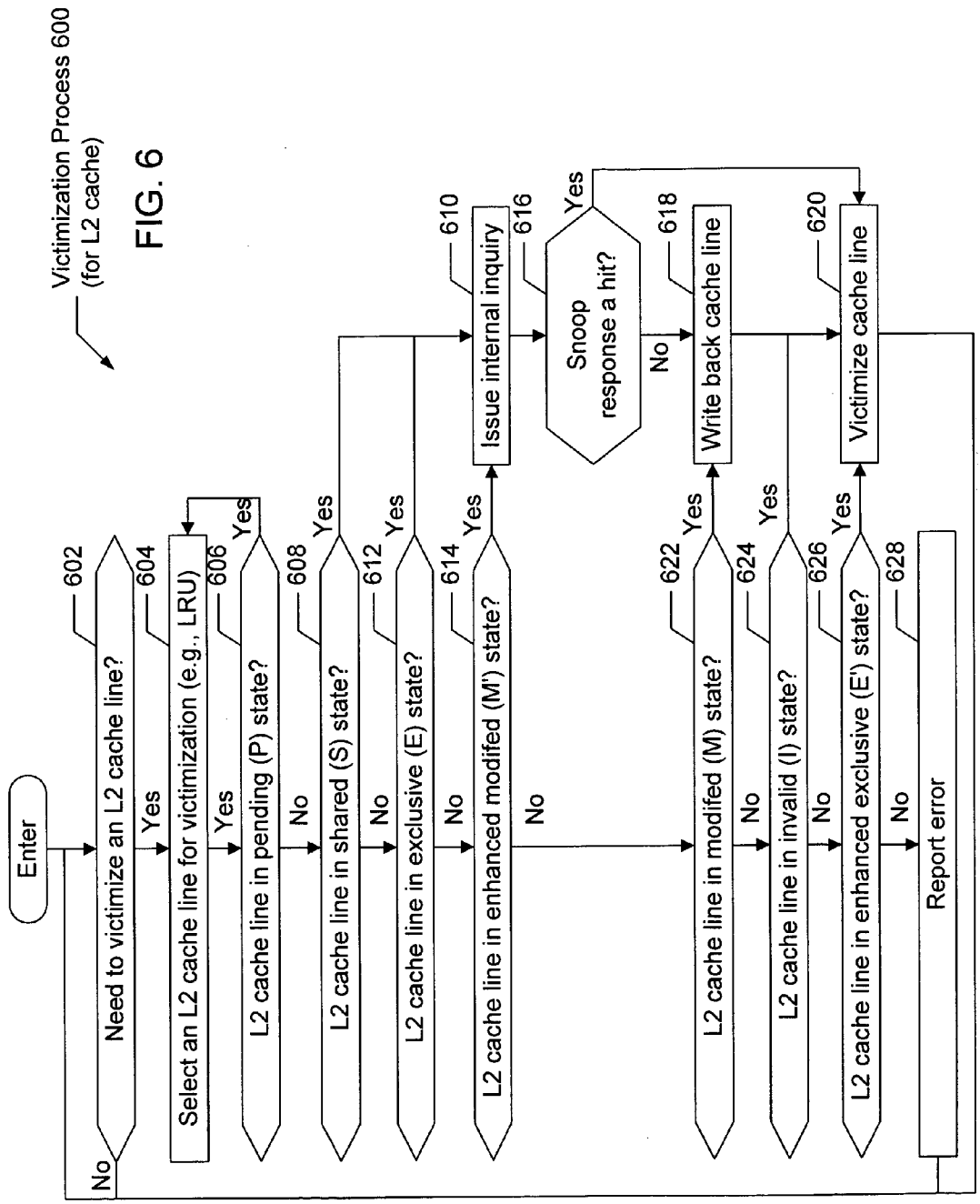
FIG. 6 is a flowchart representative of an example process which may be executed by a device to implement an example mechanism for victimizing cache lines in the L2 cache illustrated in FIG. 3.

FIG. 6 is a flowchart representative of an example process 600 which may be executed by a device (e.g., L2 cache 204b and/or memory controller 208) to implement an example mechanism for victimizing lines in a cache (e.g., L2 cache 204b). Preferably, the illustrated process 600 is embodied in an integrated circuit associated with a cache device 204b. However, the illustrated process 600 may be embodied in one or more software programs which are stored in one or more memories (e.g., flash memory 112 and/or hard disk 120) and executed by one or more processors (e.g., multi-processor module 106) in a well known manner. Although the process 600 is described with reference to the flowchart illustrated in FIG. 6, a person of ordinary skill in the art will readily appreciate that many other methods of performing the process 600 may be used. For example, the order of many of the blocks may be altered, the operation of one or more blocks may be changed, blocks may be combined, and/or blocks may be eliminated.

In general, the example process 600 handles the victimization of a cache line. A victimized cache line is a cache line that is overwritten by another cache line or returned to the invalid state 502. A cache line may be victimized according to any well known victimization policy. For example, a least-recently-used (LRU) policy may be employed to select a cache line for victimization. Once a cache line is selected for victimization, the process 600 determines the current state of the selected cache line. Depending on the current state of the selected cache line, the process 600 may issue an internal inquiry and/or perform a write-back operation prior to victimizing the selected cache line.

The example process 600 begins by determining if a cache line in an L2 cache 204b needs to be victimized (block 602). For example, if a new cache line is about to be read into the cache 204b, the cache 204b may need to remove an existing cache line in order to make room for the new cache line. When a cache line needs to be victimized, the process 600 selects a cache line for victimization (block 604). This selection may be performed according to any well known cache victimization selection process. For example, a least recently used (LRU) process may be used to select a cache line for victimization.

Once a cache line is selected for victimization, the process 600 determines what state the selected cache line is in. In the illustrated example, if the L2 cache line is in the pending state (block 606), the process 600 loops back to select another cache line (block 604). If the L2 cache line is in the shared state 512 (block 608), the process 600 issues an internal inquiry (block 610). Similarly, if the L2 cache line is in the exclusive state 504 (block 612) or the enhanced modified state 510 (block 614), the process 600 issues the internal inquiry (block 610).

Figure 7:
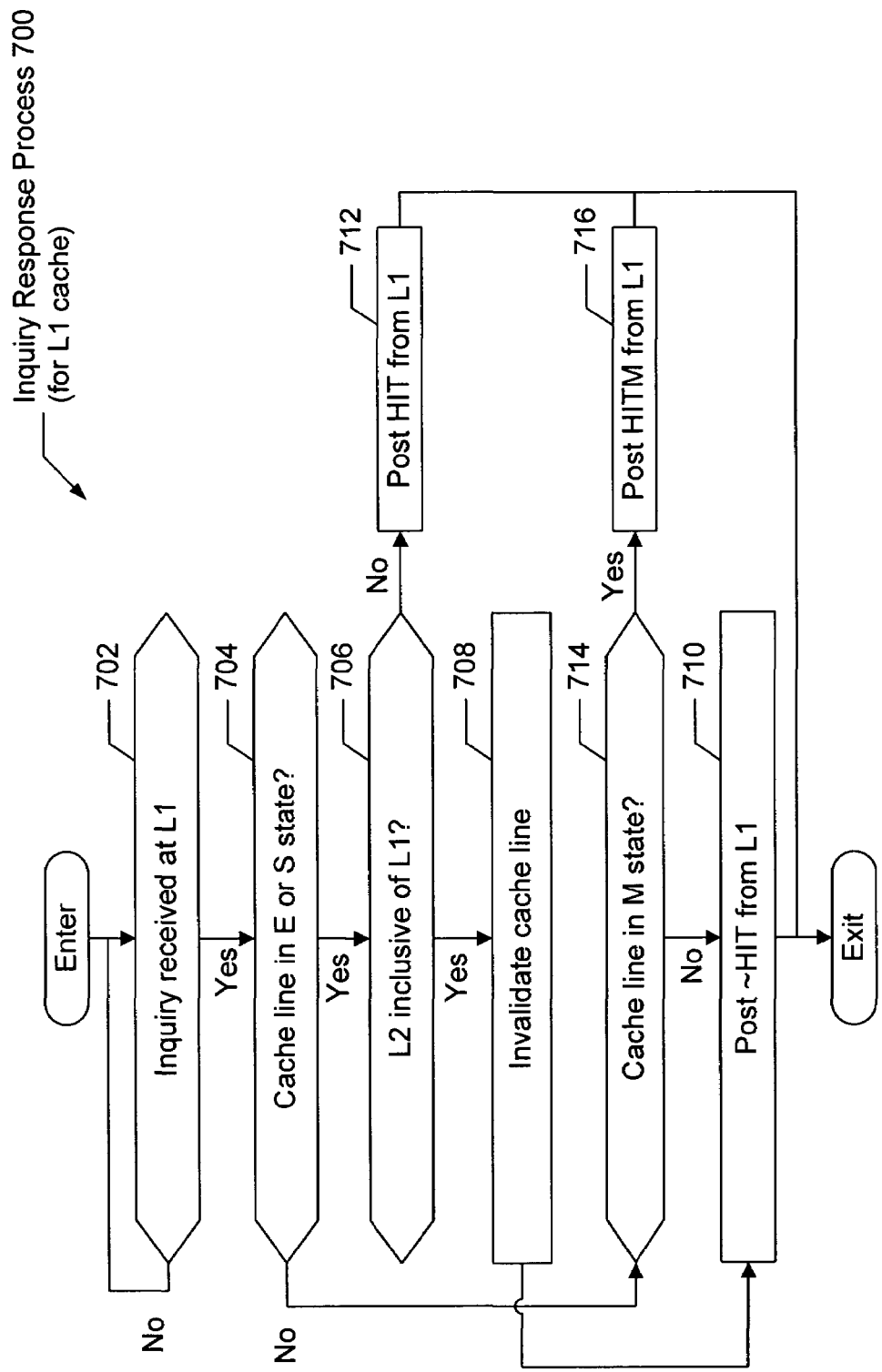
FIG. 7 is a flowchart representative of an example process which may be executed by a device to implement an example mechanism for responding to an internal inquiry at the L1 cache illustrated in FIG. 3.

As described below with reference to FIG. 7, the internal inquiry generates a snoop response from other caches (e.g., the L1 cache 204a). A "hit" snoop response means another cache (e.g., the L1 cache 204a) also holds the selected cache line (i.e., the cache line that is about to be victimized). A "no hit" snoop response means no other cache holds the selected cache line. If the snoop response is a "no hit" (block 616), the process 600 writes the selected cache line back to main memory 110 (block 618) before the cache line is victimized (block 620). If the snoop response is a "hit" (block 616), the process 600 may victimize the cache line (block 620) without performing the write-back (block 618).

The L1 cache posts a "no hit" if the inquiry is due to an L2 victim in the enhanced modified state 510 and the L1 state is not modified. The L1 cache 204a invalidates its entry if the inquiry is due to an L2 victim in the enhanced modified state 510 and the L1 state is exclusive 404 or shared 408. The L1 cache 204a need not invalidate an exclusive 404 or shared 408 line upon receiving an inquiry if the L2 cache 204b is not designed to be inclusive of the L1 cache 204a. The L1 cache 204a posts a "no hit" if the L1 state is not modified and if the L2 cache is designed to be inclusive of the L1 cache 204a. The L1 cache 204a should invalidate an exclusive 404 or shared 408 line upon receiving an inquiry if the L2 cache 204b is designed to be inclusive of the L1 cache 204a.

If the L2 cache line is in the modified state 508 (block 622), the process 600 may write the selected cache line back to main memory 110 (block 618) and victimize the cache line (block 620) without the need for the internal inquiry (block 610). If the L2 cache line is in the invalid state 502 (block 624) or the enhanced exclusive state 506 (block 626), the process 600 may victimize the selected cache line without the need for the internal inquiry (block 610) or the write-back (block 618). If the L2 cache line is not in any of the predefined states, the process 600 may generate an error (block 628).

FIG. 6b is a flowchart representative of an example process 650 which may be executed by a device (e.g., L2 cache 204b and/or memory controller 208) to implement an example mechanism for victimizing lines in a L2 cache 204b when the L2 cache 204b is designed to be inclusive of the L1 cache 204a. Preferably, the illustrated process 650 is embodied in an integrated circuit associated with a cache device 204b. However, the illustrated process 650 may be embodied in one or more software programs which are stored in one or more memories (e.g., flash memory 112 and/or hard disk 120) and executed by one or more processors (e.g., multi-processor module 106) in a well known manner. Although the process 650 is described with reference to the flowchart illustrated in FIG. 6b, a person of ordinary skill in the art will readily appreciate that many other methods of performing the process 650 may be used. For example, the order of many of the blocks may be altered, the operation of one or more blocks may be changed, blocks may be combined, and/or blocks may be eliminated.

In general, the example process 650 handles the victimization of a cache line. A victimized cache line is a cache line that is overwritten by another cache line or returned to the invalid state 502. A cache line may be victimized according to any well known victimization policy. For example, a least-recently-used (LRU) policy may be employed to select a cache line for victimization. Once a cache line is selected for victimization, the process 650 determines the current state of the selected cache line. Depending on the current state of the selected cache line, the process 650 may issue an internal inquiry and/or perform a write-back operation prior to victimizing the selected cache line.

The example process 650 begins by determining if a cache line in an L2 cache 204b needs to be victimized (block 652). For example, if a new cache line is about to be read into the cache 204b, the cache 204b may need to remove an existing cache line in order to make room for the new cache line. When a cache line needs to be victimized, the process 650 selects a cache line for victimization (block 654). This selection may be performed according to any well known cache victimization selection process. For example, a least recently used (LRU) process may be used to select a cache line for victimization.

Once a cache line is selected for victimization, the process 650 determines what state the selected cache line is in. In the illustrated example, if the L2 cache line is in the pending state (block 656), the process 650 loops back to select another cache line (block 654). If the L2 cache line is in the shared state 512 (block 658), the process 650 issues an internal inquiry (block 660) before the cache line is victimized (block 662).

If the L2 cache line is in the exclusive state 504 (block 664), the process 650 issues an internal inquiry (block 666). As described below with reference to FIG. 7, the internal inquiry generates a snoop response from other caches (e.g., the L1 cache 204a). If the snoop response is a "hit modified" response (block 668), the process 650 issues an invalidate signal on the FSB (block 670) before the cache line is victimized (block 662). If the snoop response is not a "hit modified" response (block 668), the process 650 may victimize the cache line (block 662) without issuing an invalidate signal on the FSB (block 670). If the L2 cache line is in the enhanced exclusive state 506 (block 672), the process 650 may issue the invalidate signal on the FSB (block 670) and victimize the cache line (block 662) without issuing the internal inquiry (block 666).

If the L2 cache line is in the enhanced modified state 510 (block 674), the process 650 issues an internal inquiry (block 676). As described below with reference to FIG. 7, the internal inquiry generates a snoop response from other caches (e.g., the L1 cache 204a). If the snoop response is a "hit modified" response (block 678), the process 650 issues an invalidate signal on the FSB (block 670) before the cache line is victimized (block 662). If the snoop response is not a "hit modified" response (block 678), the process 650 writes the selected cache line back to main memory 110 (block 680) before the cache line is victimized (block 662). If the L2 cache line is in the modified state 508 (block 682), the process 650 may write the cache line back to main memory 110 (block 680) and victimize the cache line (block 662) without issuing the internal inquiry (block 676).

If the L2 cache line is in the invalid state 502 (block 684), the process 650 victimizes the selected cache line (block 662). If the L2 cache line is not in any of the predefined states, the process 650 may generate an error (block 686).

As discussed above, the internal inquiry generates a snoop response. FIG. 7 is a flowchart representative of an example process 700 which may be executed by a device (e.g., L1 cache 204a) to implement an example mechanism for responding to the internal inquiry. Preferably, the illustrated process 700 is embodied in an integrated circuit associated with a cache device 204a. However, the illustrated process 700 may be embodied in one or more software programs which are stored in one or more memories (e.g., flash memory 112 and/or hard disk 120) and executed by one or more processors (e.g., multi-processor module 106) in a well known manner. Although the process 700 is described with reference to the flowchart illustrated in FIG. 7, a person of ordinary skill in the art will readily appreciate that many other methods of performing the process 700 may be used. For example, the order of many of the blocks may be altered, the operation of one or more blocks may be changed, blocks may be combined, and/or blocks may be eliminated.

In general, the example process 700 responds to an internal inquiry by posting a hit or a hit-modified signal depending on the current state of the cache line associated with the internal inquiry in the L1 cache 204a. When the L2 cache 204b is inclusive of the L1 cache 204a, victimization in the L2 cache 204b requires invalidation from the L1 cache 204a. When the L2 cache 204b is not inclusive of the L1 cache 204a, victimization from L2 cache 204b need not result in invalidation from the L1 cache 204a.

The illustrated process 700 begins by waiting for the internal inquiry (block 702). When the internal inquiry is received, the process 700 determines if the cache line associated with the internal inquiry is in the L1 cache 204a in the exclusive state 404 or the shared state 408 (block 704). If the cache line associated with the internal inquiry is in the L1 cache 204a in the exclusive state 404 or the shared state 408, the process 700 determines if the L2 cache 204b is inclusive of the L1 cache 204a (block 706). If the L2 cache 204b is inclusive of the L1 cache 204a, the process 700 invalidates the cache line (block 708) and posts a ~HIT signal (i.e., a NO HIT or a MISS) signal from the L1 cache 204a (block 710). If the L2 cache 204b is not inclusive of the L1 cache 204a (block 706), the process 700 posts a hit signal (block 712).

If the cache line is not in the exclusive state 404 or the shared state 408 (block 704), the process 700 determines if the cache line associated with the internal inquiry is in the L1 cache 204a in the modified state 406 (block 714). If the cache line associated with the internal inquiry is in the L1 cache 204a in the modified state 406, the process 700 posts a HITM (i.e., a HIT MODIFIED) signal from the L1 cache 204a (block 716). The HITM signal indicates to other caches that this L1 cache 204b holds the cache line associated with the snoop probe in a modified state. If the cache line associated with the internal inquiry is not in the L1 cache 204a, the process posts a ~HIT signal (i.e., a NO HIT or a MISS) signal from the L1 cache 204a (block 710). The ~HIT signal indicates to other caches that this L1 cache 204a does not hold the cache line in any non-pending state.

Figure 8:
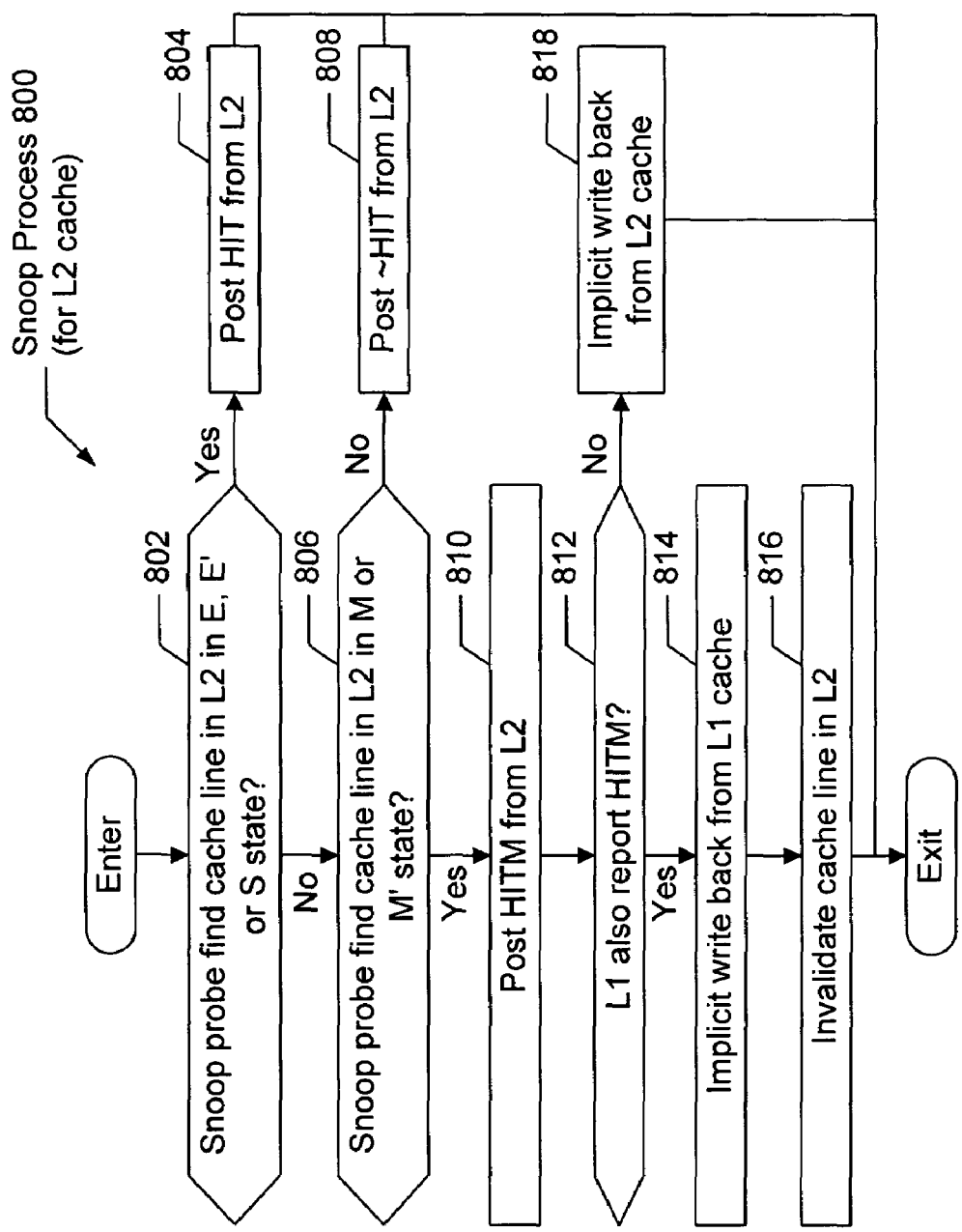
FIG. 8 is a flowchart representative of an example process which may be executed by a device to implement an example mechanism for handling snoop probes to the L2 cache illustrated in FIG. 3.

FIG. 8 is a flowchart representative of an example process 800 which may be executed by a device to implement an example mechanism for handling snoop probes to a cache using the enhanced MESI protocol (e.g., L2 cache 204b). Preferably, the illustrated process 800 is embodied in an integrated circuit associated with a cache device 204b. However, the illustrated process 800 may be embodied in one or more software programs which are stored in one or more memories (e.g., flash memory 112 and/or hard disk 120) and executed by one or more processors (e.g., multi-processor module 106) in a well known manner. Although the process 800 is described with reference to the flowchart illustrated in FIG. 8, a person of ordinary skill in the art will readily appreciate that many other methods of performing the process 800 may be used. For example, the order of many of the blocks may be altered, the operation of one or more blocks may be changed, blocks may be combined, and/or blocks may be eliminated.

In general, the example process 800 handles snoop probes to the L2 cache 204b by determining what state (if any) the cache line associated with the snoop probe is in and posting a signal indicative of the current cache line state. In addition, the process 800 determines which cache (if any) has an implicit write-back of the cache line, and the process 800 may invalidate the cache line in the L2 cache 204b.

The illustrated process 800 begins by determining if the cache line associated with the snoop probe is in the L2 cache 204b in the exclusive state 504, the enhanced exclusive state 506, or the shared state 512 (block 802). If the cache line associated with the snoop probe is in the L2 cache in the exclusive state 504, the enhanced exclusive state 506, or the shared state 512, the process 800 posts a HIT signal from the L2 cache 204b (block 804). The HIT signal indicates to other caches that this L2 cache 204b holds the cache line associated with the snoop probe in a non-modified state.

If the cache line associated with the snoop probe is not in the L2 cache in the exclusive state 504, the enhanced exclusive state 506, or the shared state 512, the process 800 determines if the cache line associated with the snoop probe is in the L2 cache 204b in the modified state 508 or the enhanced modified state 510 (block 806). If the cache line associated with the snoop probe is not in the L2 cache 204b in the exclusive state 504, the enhanced exclusive state 506, the shared state 512, the modified state 508, or the enhanced modified state 510, the process 800 posts a ~HIT (i.e., a NO HIT or a MISS) signal from the L2 cache 204b (block 808). The ~HIT signal indicates to other caches that this L2 cache 204b does not hold the cache line associated with the snoop probe in any valid or non-pending state.

If the cache line associated with the snoop probe is in the L2 cache 204b in the modified state 508 or the enhanced modified state 510, the process 800 posts a HITM (i.e., a HIT MODIFIED) signal from the L2 cache 204b (block 810). The HITM signal indicates to other caches that this L2 cache 204b holds the cache line associated with the snoop probe in a modified (or enhanced modified) state.

After the process 800 posts the HITM signal (block 810), the process 800 determines if the L1 cache 204a also posted a HITM signal (block 812). If the L1 cache 204a also posted a HITM signal, there is an implicit write-back of the cache line associated with the snoop probe from the L1 cache 204a (block 814). As a result, the L2 cache 204a may invalidate the cache line (block 816). However, if the L1 cache 204a does not post a HITM signal, there is an implicit write-back of the cache line associated with the snoop probe from the L2 cache 204b (block 818). As a result, the L2 cache 204a may not invalidate the cache line.

Figure 9:
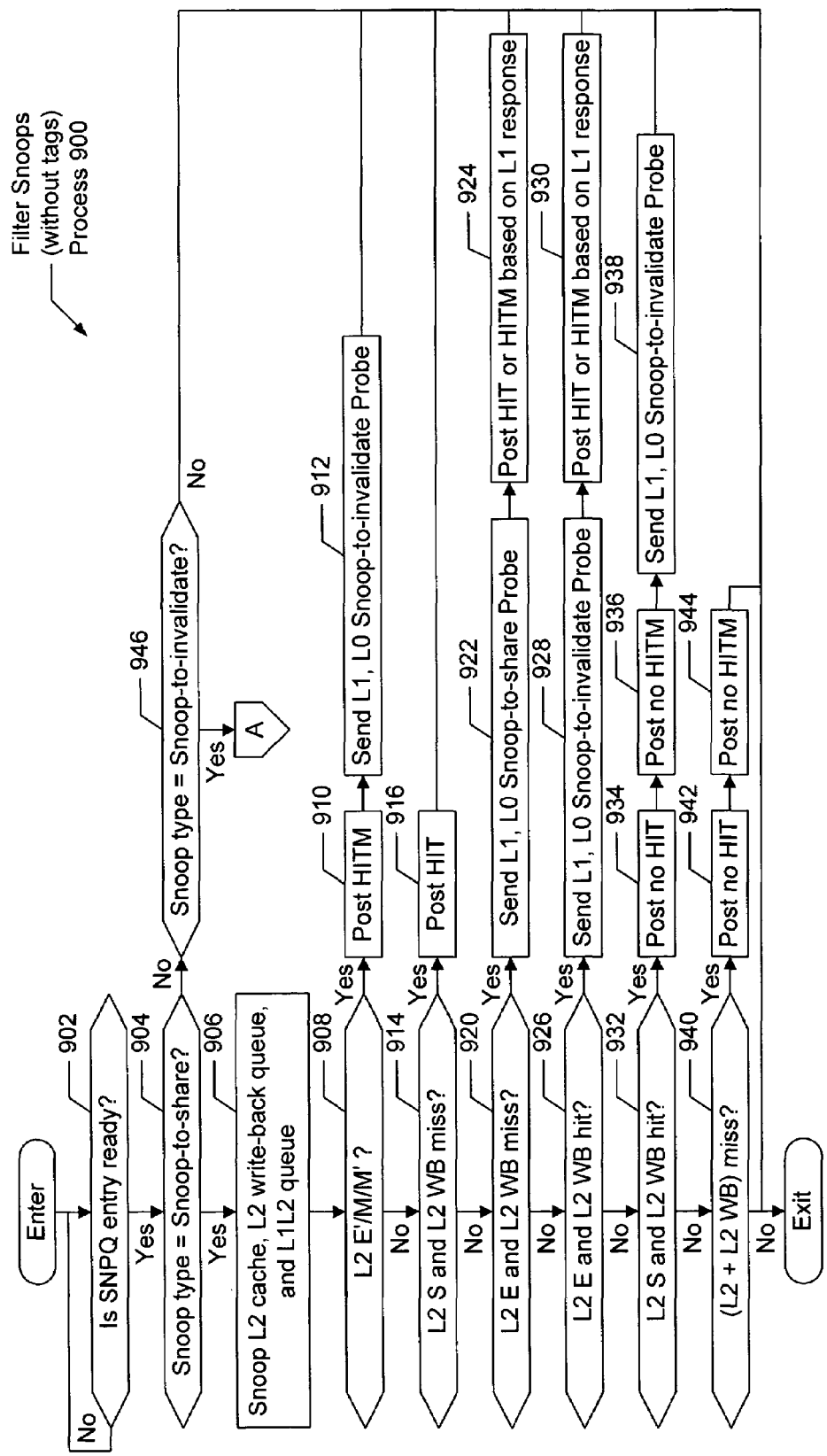
FIGS. 9-10 are a flowchart representative of an example process which may be executed by a device to implement an example mechanism for filtering snoops without the use of tags.
Figure 10:
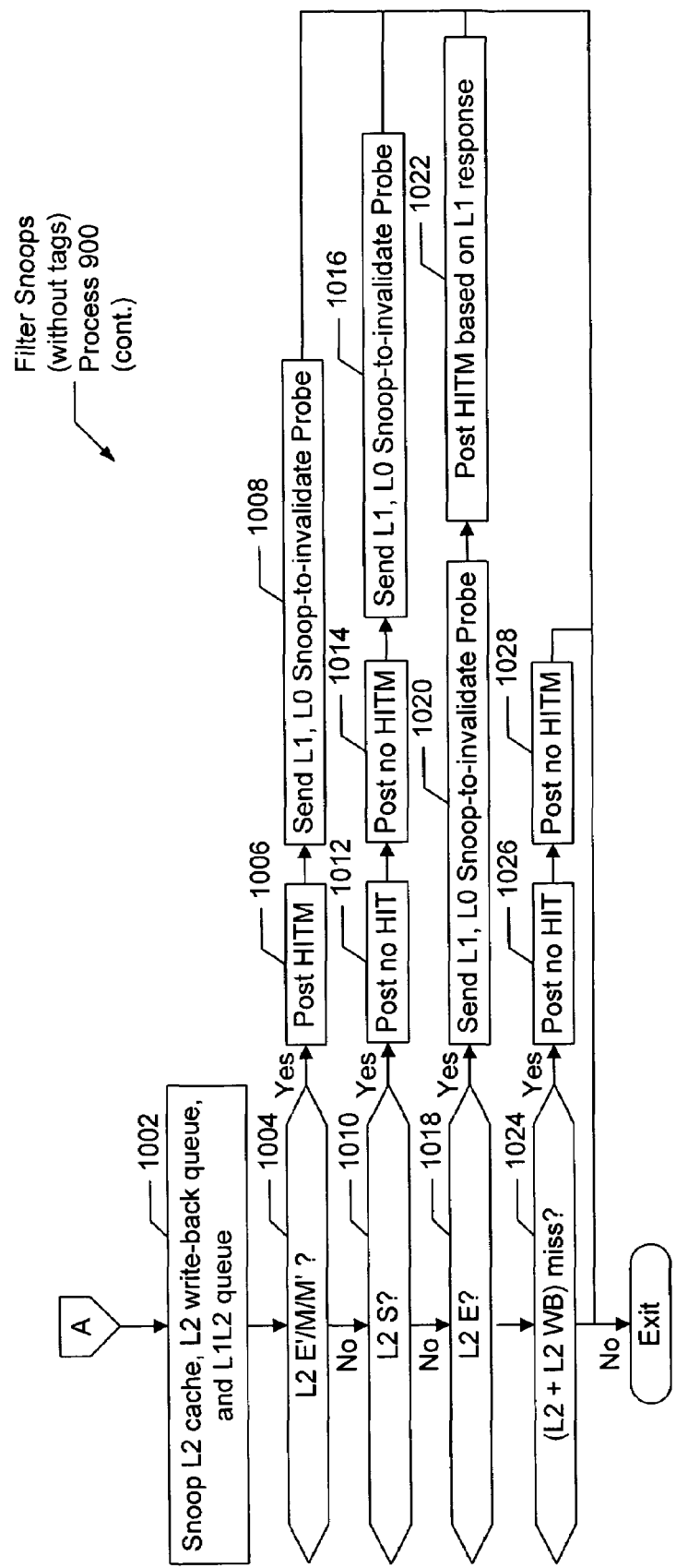

FIGS. 9-10 are a flowchart representative of an example process 900 which may be executed by a device (e.g., L2 cache 204b and/or memory controller 208) to implement an example mechanism for filtering snoops (without the use of tags as described below with reference to FIGS. 11-12). Preferably, the illustrated process 900 is embodied in an integrated circuit associated with the memory hierarchy 300. However, the illustrated process 900 may be embodied in one or more software programs which are stored in one or more memories (e.g., flash memory 112 and/or hard disk 120) and executed by one or more processors (e.g., multi-processor module 106) in a well known manner. Although the process 900 is described with reference to the flowchart illustrated in FIGS. 9-10, a person of ordinary skill in the art will readily appreciate that many other methods of performing the process 900 may be used. For example, the order of many of the blocks may be altered, the operation of one or more blocks may be changed, blocks may be combined, and/or blocks may be eliminated.

In general, the example process 900 monitors a snoop queue. Depending on the type of snoop probe in the snoop queue and the state of the associated cache line in the L2 cache 204b, the L2 write-back queue 306, and/or the L1L2 queue 304, the process 900 posts information and sends snoop probes to other caches in an effort to filter snoops and reduce bus traffic. This process 900 assumes that the L2 cache 204b is maintained inclusive of the L1 cache 204a by using an L2 victimization process (see FIG. 6b). The L2 write-back queue 306 and the L1L2 queue 304 are considered part of the L2 cache 204b for snoop purposes. A snoop probe that finds a line in L2 write-back queue 306 is interpreted as finding the line in L2 cache 204b in that state. A snoop probe that finds an L1 write-back in the L1L2 queue 304 is interpreted as finding the line in the L2 cache 204b in the modified state 508.

The illustrated process 900 begins by waiting for an entry in the snoop queue (block 902). A snoop queue entry is a snoop probe that would normally be propagated to all the cache devices. When an entry in the snoop queue is ready, the process 900 determines if the type of entry in the snoop queue is a snoop-to-share type (block 904). A snoop-to-share entry is an entry that causes a cache line to transition to the shared state if a hit is found. If the type of entry in the snoop queue is a snoop-to-share entry, the process 900 sends a snoop probe only to the L2 cache 204b, the L2 write-back queue 306, and the L1L2 queue 304 (block 906).

The process 900 may send the snoop probe to each of these entities simultaneously or one at a time. In the event the snoop probe is sent to the L2 cache 204b, the L2 write-back queue 306, and the L1L2 queue 304 one at a time, the process 900 may not send the snoop probe to all of these entities if a predetermined state is found before the snoop probe is sent to all of the entities. Accordingly, the tests described below may be rearranged to perform all of the tests for one of the entities before moving on to the tests for another of the entities. For example, the process 900 may check for each of the L2 cache 204b states described below before moving on to test each of the L2 write-back queue 306 states.

In any event, if the response to the snoop probe is indicative of the L2 cache 204b holding the cache line in the enhanced exclusive state 506, the modified state 508, or the enhanced modified state 510 (block 908), the process 900 posts a HITM signal (block 910). The HITM signal indicates to other caches that some cache 204 holds the cache line associated with the snoop probe in a modified state 406, 508 or an enhanced modified state 510. The cache that holds the cache line associated with the snoop probe in a modified state 508 or an enhanced modified state 510 may be the L2 cache 204b, as directly indicated by the L2 cache 204b posting the HITM signal in response to the L2 cache 204b holding the line in the modified state 508 or the enhanced modified state 510. Alternatively, the cache that holds the cache line associated with the snoop probe in a modified state 406 may be the L1 cache 204a, as indirectly indicated by the L2 cache 204b posting the HITM signal in response to the L2 cache 204b holding the cache line in the enhanced exclusive state 506.

In addition, if the response to the snoop probe is indicative of the L2 cache 204b holding the cache line in the enhanced exclusive state 506, the modified state 508, or the enhanced modified state 510 (block 908), the process 900 sends a snoop-to-invalidate probe to the L1 cache 204a and the L0 cache 302 (block 912). A snoop-to-invalidate probe is probe that causes a cache line to transition to the invalid state if a hit is found.

If the response to the snoop probe is indicative of the L2 cache 204b holding the cache line in the shared state 512, and the L2 write-back queue 306 posts a MISS signal (block 914), the process 900 posts a HIT signal (block 916). The MISS signal from the L2 write-back queue 306 indicates the L2 write-back queue 306 does not hold a copy of the cache line. The HIT signal from the L2 cache 204b indicates to other caches that the L2 cache 204b holds the cache line associated with the snoop probe in the shared state 512.

If the response to the snoop probe is indicative of the L2 cache 204b holding the cache line in the exclusive state 504, and the L2 write-back queue 306 posts a MISS signal (block 920), the process 900 sends a snoop-to-share probe to the L1 cache 204a and the L0 cache 302 (block 922). The process 900 then posts a HIT signal or a HITM signal based on the response to the snoop-to-share probe from the L1 cache 204a (block 924). The HIT signal is posted if the response from the L1 cache 204a is not a HITM. The HITM signal is posted if the response from the L1 cache 204a is a HITM.

If the response to the snoop probe is indicative of the L2 cache 204b holding the cache line in the exclusive state 504, and the L2 write-back queue 306 posts a HIT signal (block 926), the process 900 sends a snoop-to-invalidate probe to the L1 cache 204a and the L0 cache 302 (block 928). The HIT signal from the L2 write-back queue 306 indicates the L2 write-back queue 306 holds a copy of the cache line. The process 900 then posts a HIT signal or a HITM signal based on the response to the snoop-to-invalidate probe from the L1 cache 204a (block 930). The NO HIT signal is posted if the response from the L1 cache 204a is not a HITM. The HITM signal is posted if the response from the L1 cache 204a is a HITM.

If the response to the snoop probe is indicative of the L2 cache 204b holding the cache line in the shared state 512, and the L2 write-back queue 306 posts a HIT signal (block 932), the process 900 posts a NO HIT signal (block 934) and a NO HITM signal (block 936). In addition, the process 900 sends a snoop-to-invalidate probe to the L1 cache 204a and the L0 cache 302 (block 938).

If the L2 cache 204b and the L2 write-back queue 306 both post a MISS signal in response to the snoop probe (block 940), the process 900 posts a NO HIT signal (block 942) and a NO HITM signal (block 944).

If the type of entry in the snoop queue is not a snoop-to-share entry (block 904), the process 900 determines if the type of entry in the snoop queue is a snoop-to-invalidate type (block 946). If the type of entry in the snoop queue is a snoop-to-invalidate entry, the process 900 sends a snoop probe only to the L2 cache 204b, the L2 write-back queue 306, and the L1L2 queue 304 (block 1002 of FIG. 10).

As described above, the process 900 may send the snoop probe to each of these entities simultaneously or one at a time. In the event the snoop probe is sent to the L2 cache 204b, the L2 write-back queue 306, and the L1L2 queue 304 one at a time, the process 900 may not send the snoop probe to all of these entities if a predetermined state is found before the snoop probe is sent to all of the entities. Accordingly, the tests described below may be rearranged to perform all of the tests for one of the entities before moving on to the tests for another of the entities. For example, the process 900 may check for each of the L2 cache 204b states described below before moving on to test each of the L2 write-back queue 306 states.

In any event, if the response to the snoop probe is indicative of the L2 cache 204b holding the cache line in the enhanced exclusive state 506, the modified state 508, or the enhanced modified state 510 (block 1004), the process 900 posts a HITM signal (block 1006). Again, the HITM signal indicates to other caches that some cache 204 holds the cache line associated with the snoop probe in a modified state 406, 508 or an enhanced modified state 510. The cache that holds the cache line in a modified state 508 or an enhanced modified state 510 may be the L2 cache 204b, as directly indicated by the L2 cache 204b posting the HITM signal in response to the L2 cache 204b holding the line in the modified state 508 or the enhanced modified state 510. Alternatively, the cache that holds the cache line in a modified state 406 may be the L1 cache 204a, as indirectly indicated by the L2 cache 204b posting the HITM signal in response to the L2 cache 204b holding the cache line in the enhanced exclusive state 506. In addition, the process 900 sends a snoop-to-invalidate probe to the L1 cache 204a and the L0 cache 302 (block 1008).

If the response to the snoop probe is indicative of the L2 cache 204b holding the cache line in the shared state 512 (block 1010), the process 900 posts a NO HIT signal (block 1012) and a NO HITM signal (block 1014). In addition, the process 900 sends a snoop-to-invalidate probe to the L1 cache 204a and the L0 cache 302 (block 1016).

If the response to the snoop probe is indicative of the L2 cache 204b holding the cache line in the exclusive state 504 (block 1018), the process 900 sends a snoop-to-invalidate probe to the L1 cache 204a and the L0 cache 302 (block 1020). The process 900 then posts a HITM signal based on the response to the snoop-to-invalidate probe from the L1 cache 204a (block 1022). The HITM signal is posted if the response from the L1 cache 204a is a HITM.

If the L2 cache 204b and the L2 write-back queue 306 both post a MISS signal in response to the snoop probe (block 1024), the process 900 posts a NO HIT signal (block 1026) and a NO HITM signal (block 1028).

Figure 11:
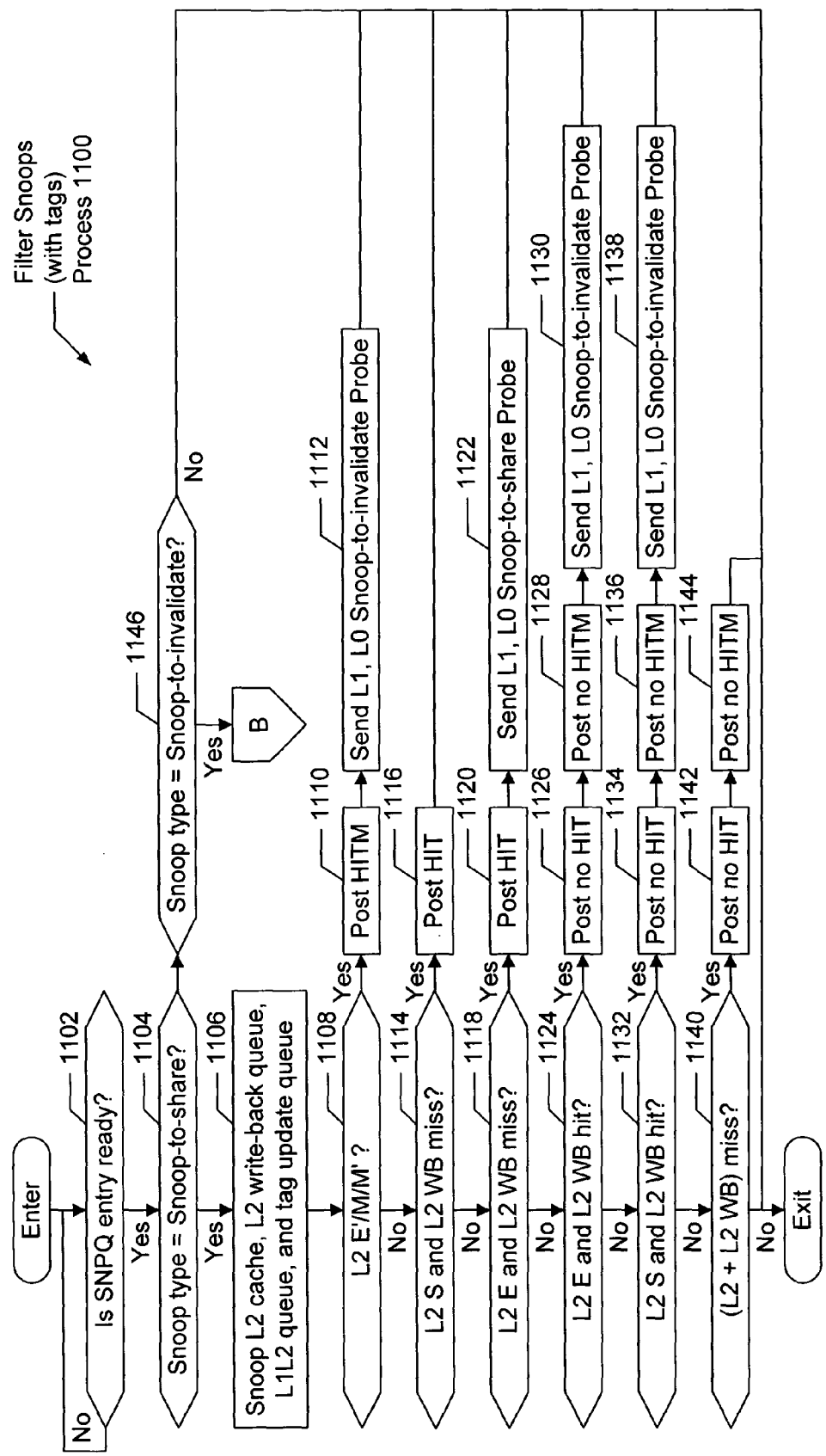
FIGS. 11-12 are a flowchart representative of an example process which may be executed by a device to implement an example mechanism for filtering snoops with the use of tags.
Figure 12:
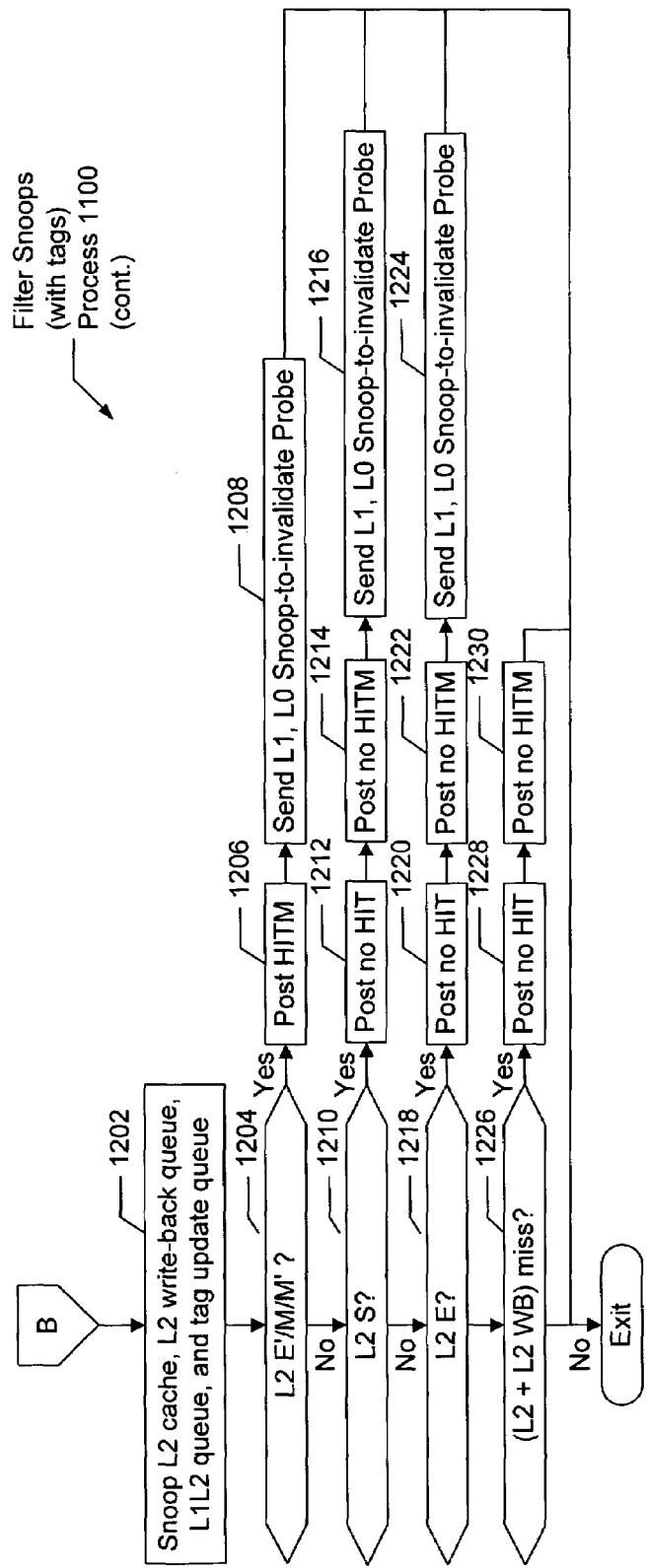

FIGS. 11-12 are a flowchart representative of an example process 1100 which may be executed by a device (e.g., L2 cache 204b and/or memory controller 208) to implement an example mechanism for filtering snoops with the use of tags. Preferably, the illustrated process 1100 is embodied in an integrated circuit associated with the memory hierarchy 300. However, the illustrated process 100 may be embodied in one or more software programs which are stored in one or more memories (e.g., flash memory 112 and/or hard disk 120) and executed by one or more processors (e.g., multi-processor module 106) in a well known manner. Although the process 1100 is described with reference to the flowcharts illustrated in FIGS. 11-12, a person of ordinary skill in the art will readily appreciate that many other methods of performing the process 1100 may be used. For example, the order of many of the blocks may be altered, the operation of one or more blocks may be changed, blocks may be combined, and/or blocks may be eliminated.

In general, the example process 1100 monitors a snoop queue. Depending on the type of snoop probe in the snoop queue and the state of the associated cache line in the L2 cache 204b, the L2 write-back queue 306, and/or the L1L2 queue 304, the process 1100 posts information and sends snoop probes to other caches in an effort to filter snoops and reduce bus traffic. This process 1100 assumes that the L2 cache 204b is maintained inclusive of the L1 cache 204a by using an L2 victimization process (see FIG. 6b). Unlike the process 900 described above, this process 1100 performs these actions with the use of the tag update queue 304 as described herein. The tag update queue 304, the L2 write-back queue 306 and the L1L2 queue 304 are considered part of the L2 cache 204b for snoop purposes. A snoop probe that finds a line in L2 write-back queue 306 is interpreted as finding the line in L2 cache 204b in that state. A snoop probe hit in the tag update queue 304 is interpreted as finding the line in L2 cache 204b in enhanced exclusive state. A snoop probe that finds an L1 write-back in the L1L2 queue 304 is interpreted as finding the line in L2 cache 204b in the modified state 508.

The illustrated process 1100 begins by waiting for an entry in the snoop queue (block 1102). Again, a snoop queue entry is a snoop probe that would normally be propagated to all the cache devices. When an entry in the snoop queue is ready, the process 1100 determines if the type of entry in the snoop queue is a snoop-to-share type (block 1104). If the type of entry in the snoop queue is a snoop-to-share entry, the process 1100 sends a snoop probe only to the L2 cache 204b, the L2 write-back queue 306, the L1L2 queue 304, and the tag update queue 304 (block 1106).

As described above, the process 1100 may send the snoop probe to each of these entities simultaneously or one at a time, and the process 1100 may not send the snoop probe to all of these entities if a predetermined state is found before the snoop probe is sent to all of the entities. Accordingly, the tests described below may be rearranged to perform all of the tests for one of the entities before moving on to the tests for another of the entities.

In any event, if the response to the snoop probe is indicative of the L2 cache 204b holding the cache line in the enhanced exclusive state 506, the modified state 508, or the enhanced modified state 510 (block 1108), the process 1100 posts a HITM signal (block 1110). Again, the HITM signal indicates to other caches that some cache 204 holds the cache line associated with the snoop probe in a modified state 406, 508 or an enhanced modified state 510. The cache that holds the cache line associated with the snoop probe in a modified state 508 or an enhanced modified state 510 may be the L2 cache 204b, as directly indicated by the L2 cache 204b indicating it is holding the line in the modified state 508 or the enhanced modified state 510. Alternatively, the cache that holds the cache line associated with the snoop probe in a modified state 406 may be the L1 cache 204a, as indirectly indicated by the L2 cache 204b indicating it is holding the cache line in the enhanced exclusive state 506.

In addition, if the response to the snoop probe is indicative of the L2 cache 204b holding the cache line in the enhanced exclusive state 506, the modified state 508, or the enhanced modified state 510 (block 1108), the process 1100 sends a snoop-to-invalidate probe to the L1 cache 204a and the L0 cache 302 (block 1112).

If the response to the snoop probe is indicative of the L2 cache 204b holding the cache line in the shared state 512, and the L2 write-back queue 306 posts a MISS signal (block 1114), the process 1100 posts a HIT signal (block 1116). The HIT signal indicates to other caches that the L2 cache 204b holds the cache line associated with the snoop probe in the shared state 512.

If the response to the snoop probe is indicative of the L2 cache 204b holding the cache line in the exclusive state 504, and the L2 write-back queue 306 posts a MISS signal (block 1118), the process 1100 posts a HIT signal (block 1120) and sends a snoop-to-share probe to the L1 cache 204a and the L0 cache 302 (block 1122). Unlike the process 900 described above, this process 1100 does not post a HIT signal or a HITM signal based on the response to the snoop-to-share probe from the L1 cache 204a because the process 1100 guarantees that the L1 cache 204a will not modify the cache line for which a snoop is in progress. Stores committed to that cache line prior to the snoop probe will be present in the tag update queue 304 and result in a HITM from the L2 cache 204b.

If the response to the snoop probe is indicative of the L2 cache 204b holding the cache line in the exclusive state 504, and the L2 write-back queue 306 posts a HIT signal (block 1124), the process 1100 posts a NO HIT signal (block 1126) and a NO HITM signal (block 1128). In addition, the process 1100 sends a snoop-to-invalidate probe to the L1 cache 204a and the L0 cache 302 (block 1130). Again, unlike the process 900 described above, this process 1100 does not post a HIT signal or a HITM signal based on the response to the snoop-to-invalidate probe from the L1 cache 204a.

If the response to the snoop probe is indicative of the L2 cache 204b holding the cache line in the shared state 512, and the L2 write-back queue 306 posts a HIT signal (block 1132), the process 1100 posts a NO HIT signal (block 1134) and a NO HITM signal (block 1136). In addition, the process 1100 sends a snoop-to-invalidate probe to the L1 cache 204a and the L0 cache 302 (block 1138).

If the L2 cache 204b and the L2 write-back queue 306 both post a MISS signal in response to the snoop probe (block 1140), the process 1100 posts a NO HIT signal (block 1142) and a NO HITM signal (block 1144).

If the type of entry in the snoop queue is not a snoop-to-share entry (block 1104), the process 1100 determines if the type of entry in the snoop queue is a snoop-to-invalidate type (block 1146). If the type of entry in the snoop queue is a snoop-to-invalidate entry, the process 1100 sends a snoop probe only to the L2 cache 204b, the L2 write-back queue 306, the L1L2 queue 304, and the tag update queue 304 (block 1202 of FIG. 12).

If the response to the snoop probe is indicative of the L2 cache 204b holding the cache line in the enhanced exclusive state 506, the modified state 508, or the enhanced modified state 510 (block 1204), the process 1100 posts a HITM signal (block 1206). Again, the HITM signal indicates to other caches that some cache 204 holds the cache line associated with the snoop probe in a modified state 406, 508 or an enhanced modified state 510. The cache that holds the cache line in a modified state 508 or an enhanced modified state 510 may be the L2 cache 204b, as directly indicated by the L2 cache 204b. Alternatively, the cache that holds the cache line in a modified state 406 may be the L1 cache 204a, as indirectly indicated by the L2 cache 204b indicating it is holding the cache line in the enhanced exclusive state 506. In addition, if the response to the snoop probe is indicative of the L2 cache 204b holding the cache line in the enhanced exclusive state 506, the modified state 508, or the enhanced modified state 510 (block 1204), the process 1100 sends a snoop-to-invalidate probe to the L1 cache 204a and the L0 cache 302 (block 1208).

If the response to the snoop probe is indicative of the L2 cache 204b holding the cache line in the shared state 512 (block 1210), the process 900 posts a NO HIT signal (block 1212) and a NO HITM signal (block 1214). In addition, the process 1100 sends a snoop-to-invalidate probe to the L1 cache 204a and the L0 cache 302 (block 1216).

If the response to the snoop probe is indicative of the L2 cache 204b holding the cache line in the exclusive state 504 (block 1218), the process 1100 posts a NO HIT signal (block 1220) and a NO HITM signal (block 1222). In addition, the process 1100 sends a snoop-to-invalidate probe to the L1 cache 204a and the L0 cache 302 (block 1224). Again, unlike the process 900 described above, this process 1100 does not post a HIT signal or a HITM signal based on the response to the snoop-to-invalidate probe from the L1 cache 204a.

If the L2 cache 204b and the L2 write-back queue 306 both post a MISS signal in response to the snoop probe (block 1226), the process 1100 posts a NO HIT signal (block 1228) and a NO HITM signal (block 1230).

Although the above discloses example systems, it should be noted that such systems are merely illustrative and should not be considered as limiting. For example, it is contemplated that any or all of the disclosed hardware and software components could be embodied exclusively in dedicated hardware, exclusively in software, excusively in firmware or in some combination of hardware, firmware In addition, although certain methods, apparatus, and articles of manufacture have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. A method of maintaining cache coherency comprising:
   executing a store operation that hits a cache line in a second cache;
   placing the cache line in the second cache in an enhanced exclusive state in response to the store operation when a copy of the cache line is in a first cache in a modified state and the cache line in the second cache is identical to a copy of the cache line in a main memory; and
   placing the cache line in the second cache in an enhanced modified state when a copy of the cache line may be in the first cache and the cache line in the second cache is different from the copy of the cache line in the main memory.

2. A method as defined in claim 1, wherein the first cache comprises an L1 cache and the second cache comprises an L2 cache.

3. A computing apparatus comprising:
   a first cache memory;
   a second cache memory;
   a processor operatively coupled to the first cache memory and the second cache memory, the processor executing a store operation that hits a cache line in the second cache memory, the second cache memory placing the cache line in an enhanced exclusive state in response to the store operation when a copy of the cache line is in the first cache memory in a modified state and the cache line in the second cache is identical to a copy of the cache line in a main memory, and the second cache memory placing the cache line in an enhanced modified state when a copy of the cache line may be in the first cache and the cache line in the second cache is different from the copy of the cache line in the main memory.

4. An apparatus as defined in claim 3, wherein the first cache memory comprises an L1 cache and the second cache memory comprises an L2 cache.

5. A method of victimizing a cache line in a second cache, the method comprising:
   (1) if the cache line is in an enhanced modified state:
   (a) issuing an inquiry to a first cache;
   (b) receiving a response to the inquiry; and
   (c) victimizing the cache line in the second cache without a write-back of the cache line from the second cache if the response is indicative of a cache hit; and
   (2) if the cache line is in a non-enhanced modified state, performing a write-back of the cache line from the second cache without issuing the inquiry to the first cache.

6. A method as defined in claim 5, wherein the first cache is an L1 cache and the second cache is an L2 cache.

7. A method as defined in claim 5, wherein the enhanced modified state indicates a copy of the cache line may be in the first cache.

8. A method as defined in claim 5, wherein the inquiry comprises an internal inquiry.

9. A method as defined in claim 5, further comprising performing a write-back of the cache line from the second cache if the response is indicative of a cache miss.

10. A method as defined in claim 9, further comprising victimizing the cache line in the second cache after performing the write-back if the response is indicative of a cache miss.

11. A method as defined in claim 5, further comprising victimizing the cache line in the second cache without issuing the inquiry to the first cache if the cache line is in an enhanced exclusive state indicating a copy of the cache line is in the first cache.

12. A method as defined in claim 11, wherein victimizing the cache line in the second cache if the cache line is in the enhanced exclusive state comprises victimizing the cache line in the second cache without performing a write-back of the cache line from the second cache.

13. A method as defined in claim 12, wherein the enhanced exclusive state indicates the copy of the cache line in the first cache is in a modified state.

14. An apparatus comprising:
a first cache memory; and
a second cache memory operatively coupled to the first cache memory, the second cache memory being structured to issue an inquiry to the first cache memory if a cache line to be victimized in the second cache memory is in an enhanced modified state, the enhanced modified state indicating a copy of the cache line may be in the first cache memory, and the second cache memory is structured to perform a write-back of the cache line from the second cache without issuing the inquiry to the first cache if the cache line is in a non-enhanced modified state, wherein the second cache memory is structured to victimize the cache line in the second cache memory without issuing the inquiry to the first cache memory if the cache line is in an enhanced exclusive state indicating a copy of the cache line is in the first cache memory in a modified state.

15. An apparatus as defined in claim 14, wherein the first cache memory is an L1 cache and the second cache memory is an L2 cache.

16. An apparatus as .defined in claim 14, further comprising a main memory operatively coupled to the second cache memory, wherein the second cache memory is structured to:
receive a response to the inquiry; and
victimize the cache line in the second cache memory without a write-back of the cache line to the main memory if the response is indicative of a cache hit.

17. An apparatus as defined in claim 16, wherein the second cache memory performs the write-back of the cache line if the response is indicative of a cache miss.

18. An apparatus as defined in claim 16, wherein the second cache memory is structured to victimize the cache line in the second cache after performing the write-back if the response is indicative of a cache miss.

19. A method of performing a cache snoop, the method comprising:
posting a snoop hit signal if a cache line in a second cache is in one of an exclusive state, an enhanced exclusive state, and a shared state, wherein the enhanced exclusive state indicates a copy of the cache line is in a first cache; and
posting a first snoop hit-modified signal if the cache line in the second cache is in one of a modified state and an enhanced modified state, wherein the enhanced modified state indicates an updated copy of the cache line may be in the first cache.

20. A method as defined in claim 19, wherein the first cache comprises an L1 cache and the second cache comprises an L2 cache.

21. A method as defined in claim 19, further comprising:
detecting a second snoop hit-modified signal from the first cache; and
invalidating the cache line in the second cache in response to detecting the second snoop hit-modified signal from the first cache.

22. A method as defined in claim 21, wherein detecting the second snoop hit-modified signal from the first cache implies a write-back of the cache line from the first cache.

23. A method as defined in claim 19, further comprising detecting an absence of a second snoop hit-modified signal from the first cache, wherein the absence of the second snoop hit-modified signal from the first cache implies a write-back of the cache line from the second cache.

24. An apparatus for performing a cache snoop, the apparatus comprising:
a processor;
a first cache operatively coupled to the processor; and
a second cache operatively coupled to the processor, the second cache being structured to post a snoop hit signal if a cache line in the second cache is in one of an exclusive state, an enhanced exclusive state, and a shared state, wherein the enhanced exclusive state indicates a modified copy of the cache line is in the first cache, wherein the second cache is structured to post a first snoop hit-modified signal if the cache line in the second cache is in one of a modified state and an enhanced modified state, wherein the enhanced modified state indicates an updated copy of the cache line may be in the first cache.

25. An apparatus as defined in claim 24, wherein the first cache comprises an L1 cache and the second cache comprises an L2 cache.

26. An apparatus for performing a cache snoop, the apparatus comprising:
a processor;
a first cache operatively coupled to the processor; and
a second cache operatively coupled to the processor, the second cache being structured to post a snoop hit signal if a cache line in the second cache is in one of an exclusive state, an enhanced exclusive state, and a shared state, wherein the enhanced exclusive state indicates a modified copy of the cache line is in the first cache and a non-modified copy of the cache line is in the second cache, wherein the second cache is structured to:
detect a snoop hit-modified signal from the first cache; and
invalidate the cache line in the second cache in response to detecting the snoop hit-modified signal from the first cache.

* * * * *